US007968239B2

(12) United States Patent
Nakaji

(10) Patent No.: US 7,968,239 B2
(45) Date of Patent: Jun. 28, 2011

(54) FUEL CELL SYSTEM WITH MULTIPLE WARM-UP MECHANISMS

(75) Inventor: Yoshiharu Nakaji, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1373 days.

(21) Appl. No.: 10/514,831

(22) PCT Filed: Oct. 1, 2003

(86) PCT No.: PCT/JP03/12602
§ 371 (c)(1),
(2), (4) Date: Nov. 18, 2004

(87) PCT Pub. No.: WO2004/042854
PCT Pub. Date: May 21, 2004

(65) Prior Publication Data
US 2005/0181246 A1    Aug. 18, 2005

(30) Foreign Application Priority Data

Nov. 7, 2002  (JP) ................................ 2002-323765

(51) Int. Cl.
*H01M 8/04* (2006.01)
(52) U.S. Cl. ........ 429/429; 429/428; 429/441; 429/433; 340/988; 180/167
(58) Field of Classification Search ............... 429/12, 429/22, 32, 23, 429, 441, 428, 433; 340/988; 180/167
See application file for complete search history.

(56) References Cited

U.S. PATENT DOCUMENTS

| 6,864,807 | B2 * | 3/2005 | Todoriki et al. | 340/988 |
| 2002/0031692 | A1 * | 3/2002 | Fuglevand et al. | 429/22 |
| 2002/0092690 | A1 * | 7/2002 | Benz et al. | 180/167 |
| 2002/0182460 | A1 * | 12/2002 | Okamoto | 429/23 |
| 2003/0008187 | A1 * | 1/2003 | Higashiyama et al. | 429/19 |
| 2003/0080875 | A1 * | 5/2003 | Wathen | 340/825.72 |
| 2003/0148154 | A1 * | 8/2003 | Kawasumi et al. | 429/20 |

FOREIGN PATENT DOCUMENTS

| JP | 8-315842 A | 11/1996 |
| JP | 9-171842 A | 6/1997 |
| JP | 2002-50378 A | 2/2002 |
| JP | 2002050378 A * | 2/2002 |
| JP | 2002-83606 A | 3/2002 |
| JP | 2002-117876 A | 4/2002 |
| JP | 2002-198081 A | 7/2002 |
| JP | 2002-219926 A | 8/2002 |
| WO | WO 02/32715 A1 | 4/2002 |

* cited by examiner

*Primary Examiner* — Dah-Wei D Yuan
*Assistant Examiner* — Zachary Best
(74) *Attorney, Agent, or Firm* — Foley & Lardner LLP

(57) ABSTRACT

A fuel cell system (1, 100) adapted to be installed on a moving object (V) is provided with an electric power generating element (31, 45) including a fuel cell (31) supplied with fuel gas and oxidizing gas to generate electric power, a warm-up mechanism (21 to 23, 32 to 39, 41 to 50') enabled to achieve warm up of the electric power generating element, and a controller (13), in response to reception of a control signal transmitted from an external remote operator unit (3) and commanding a start-up completion time at which start-up of the fuel cell system is to be completed through the warm-up of the electric power generating element, controlling the warm-up mechanism to allow the warm-up of at least the electric power generating element to be completed in alignment with the start-up completion time.

33 Claims, 11 Drawing Sheets

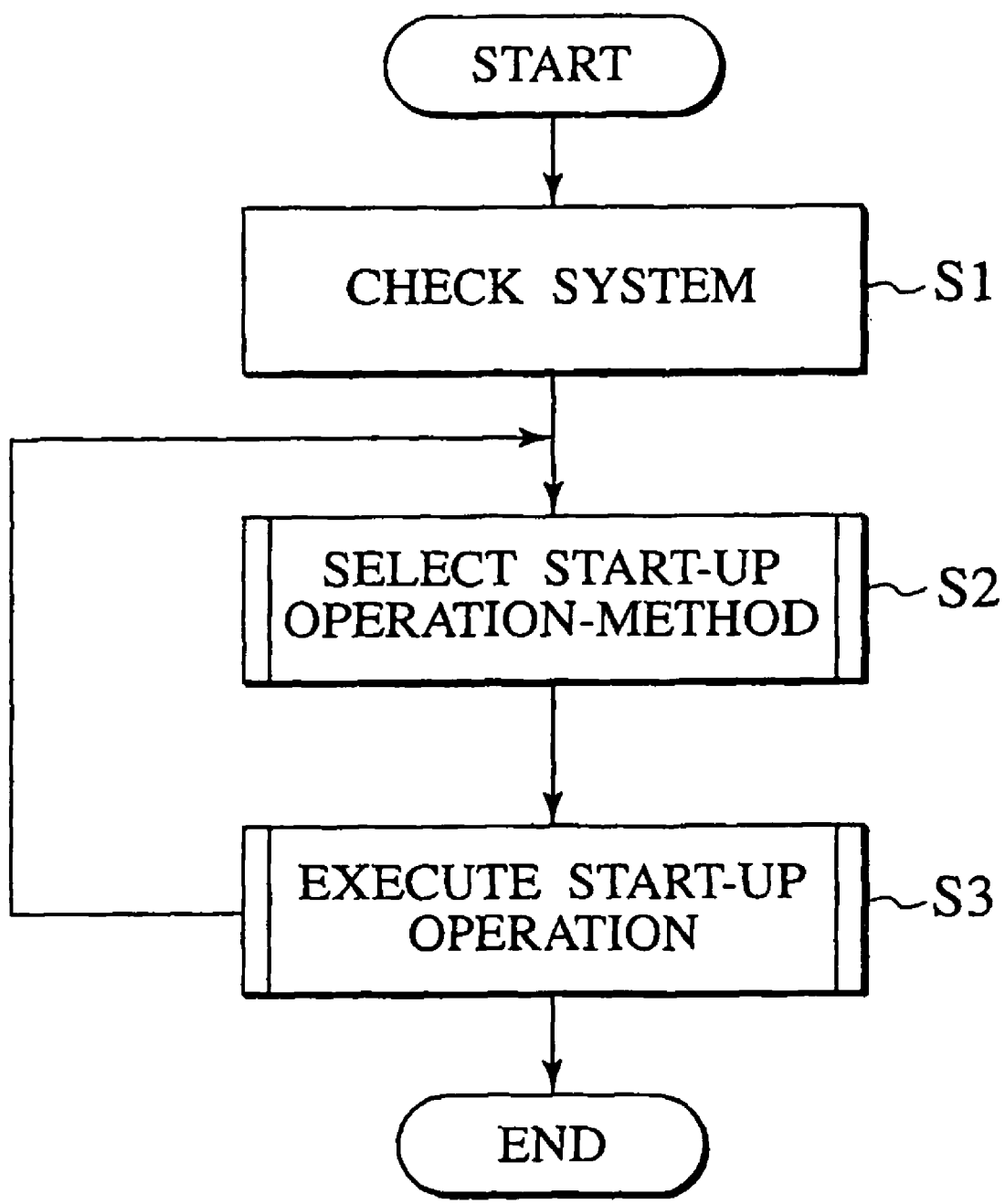

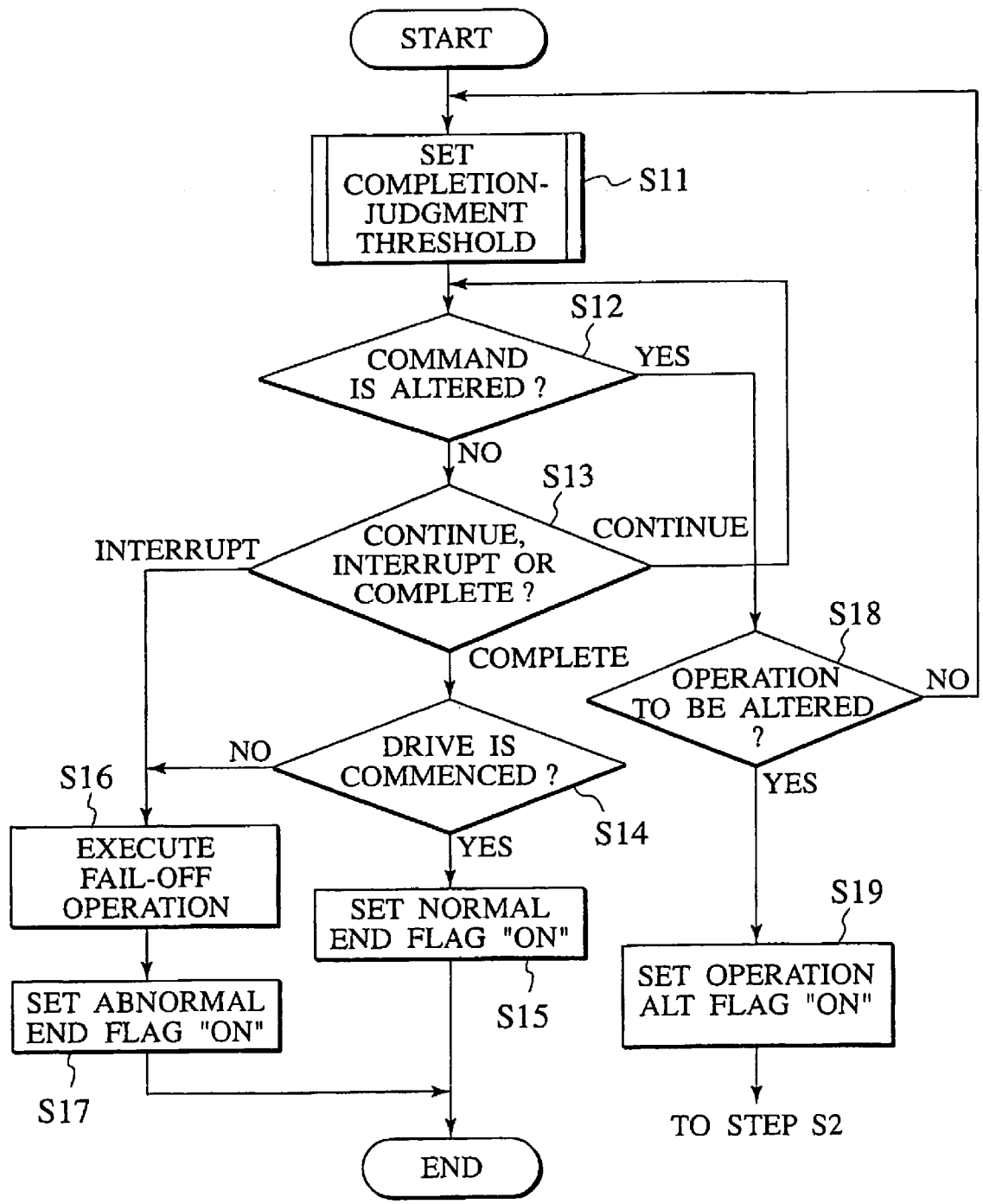

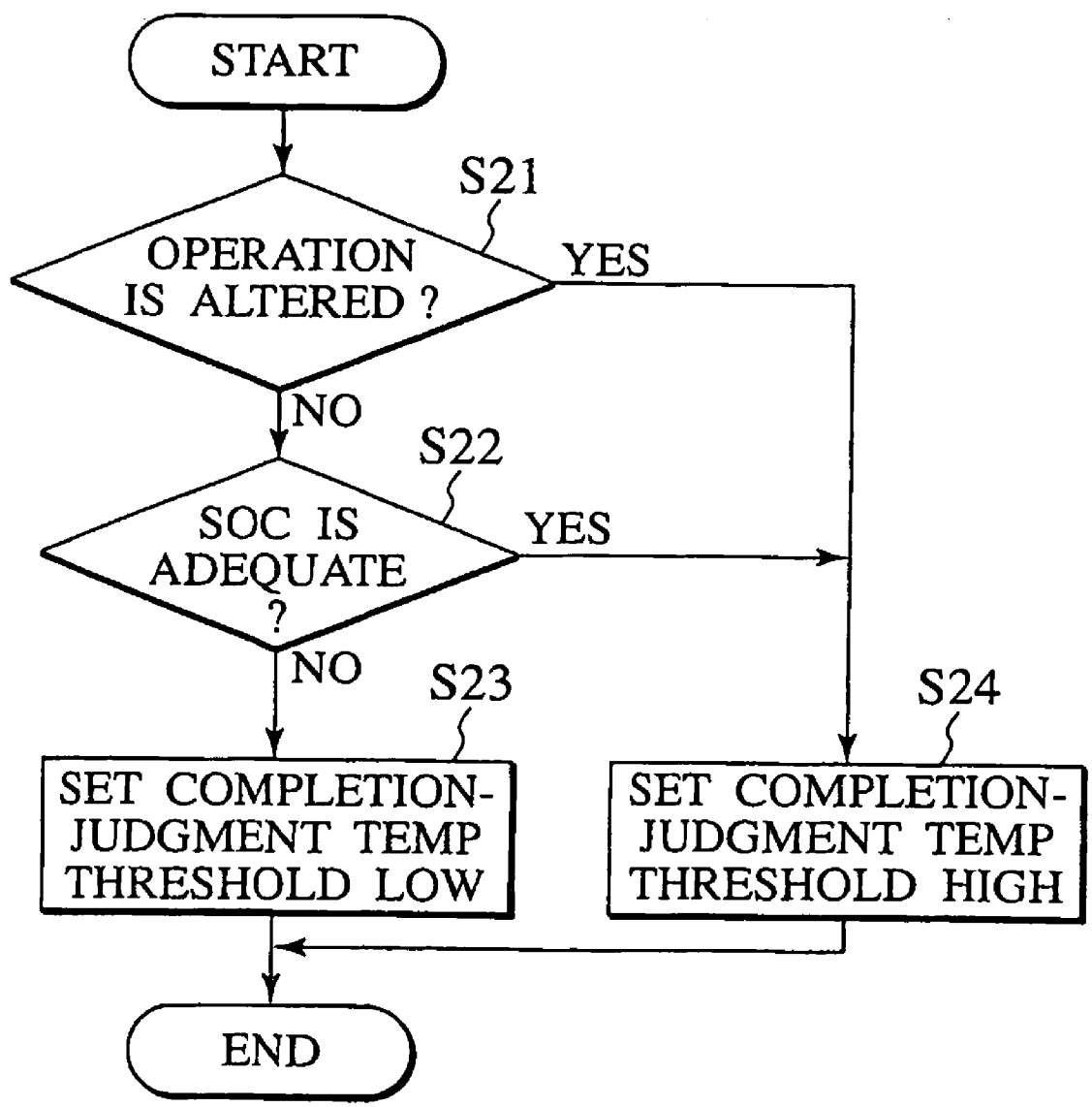

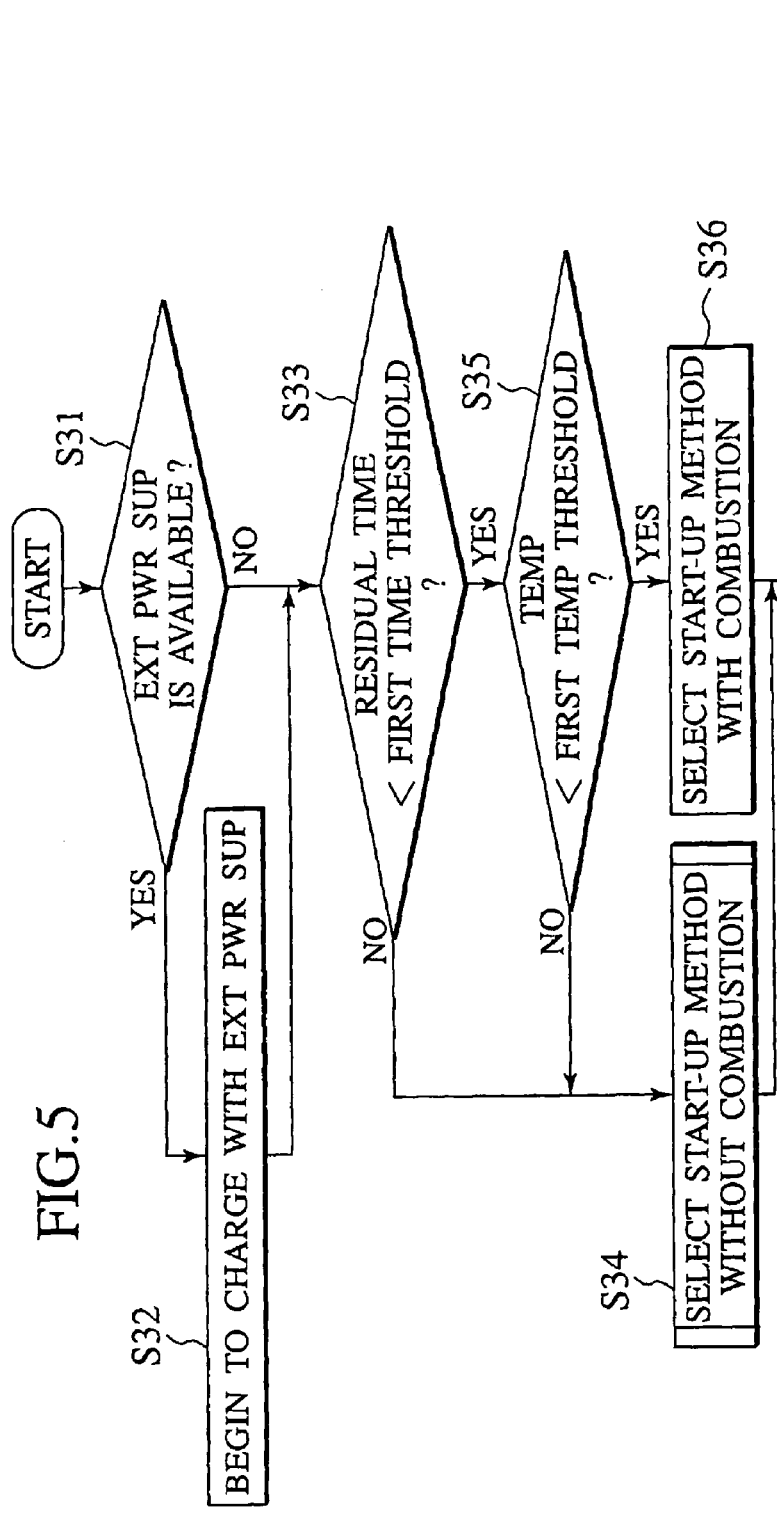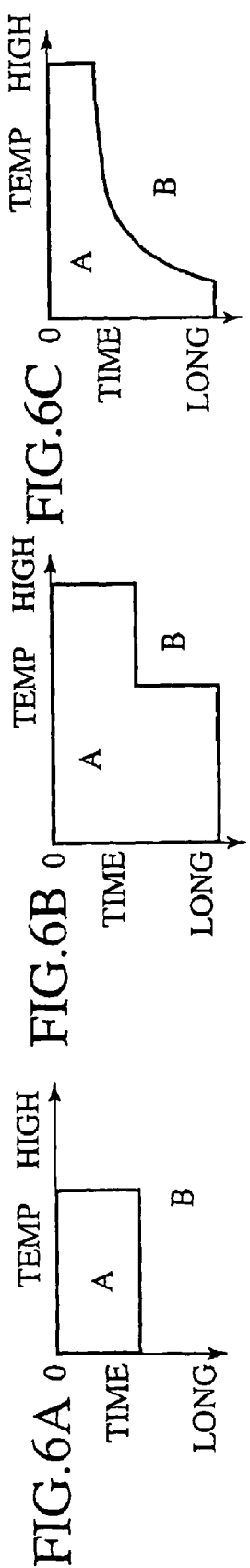

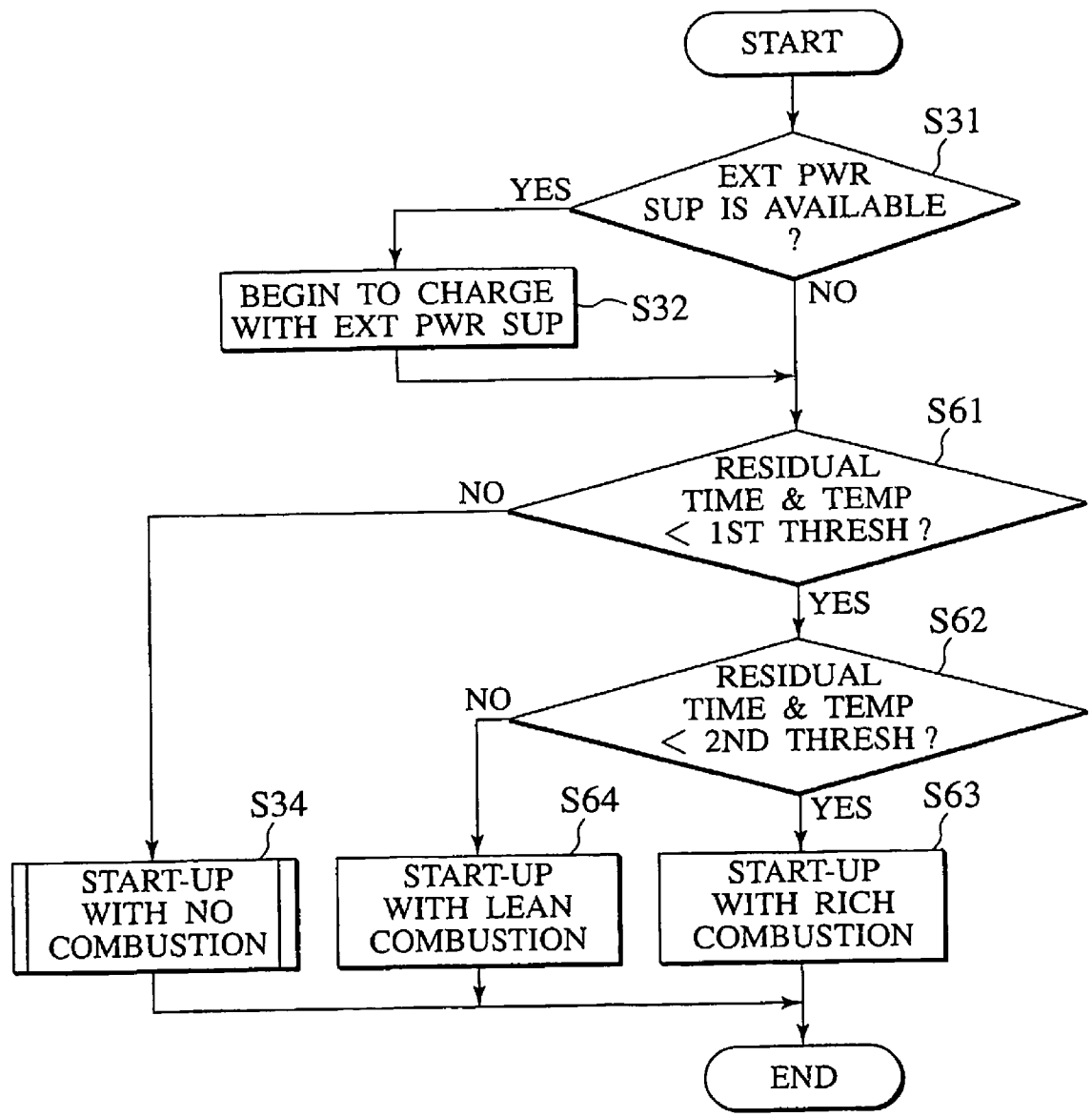

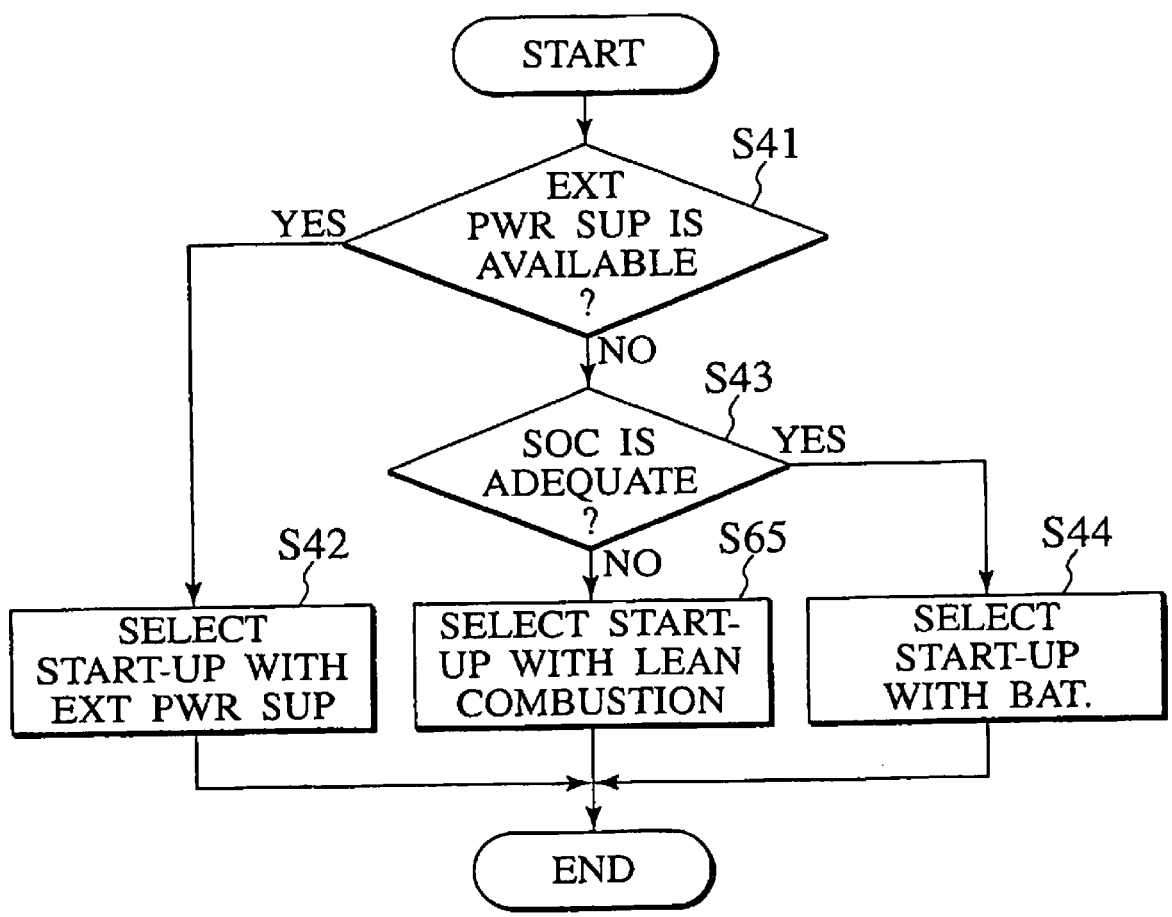

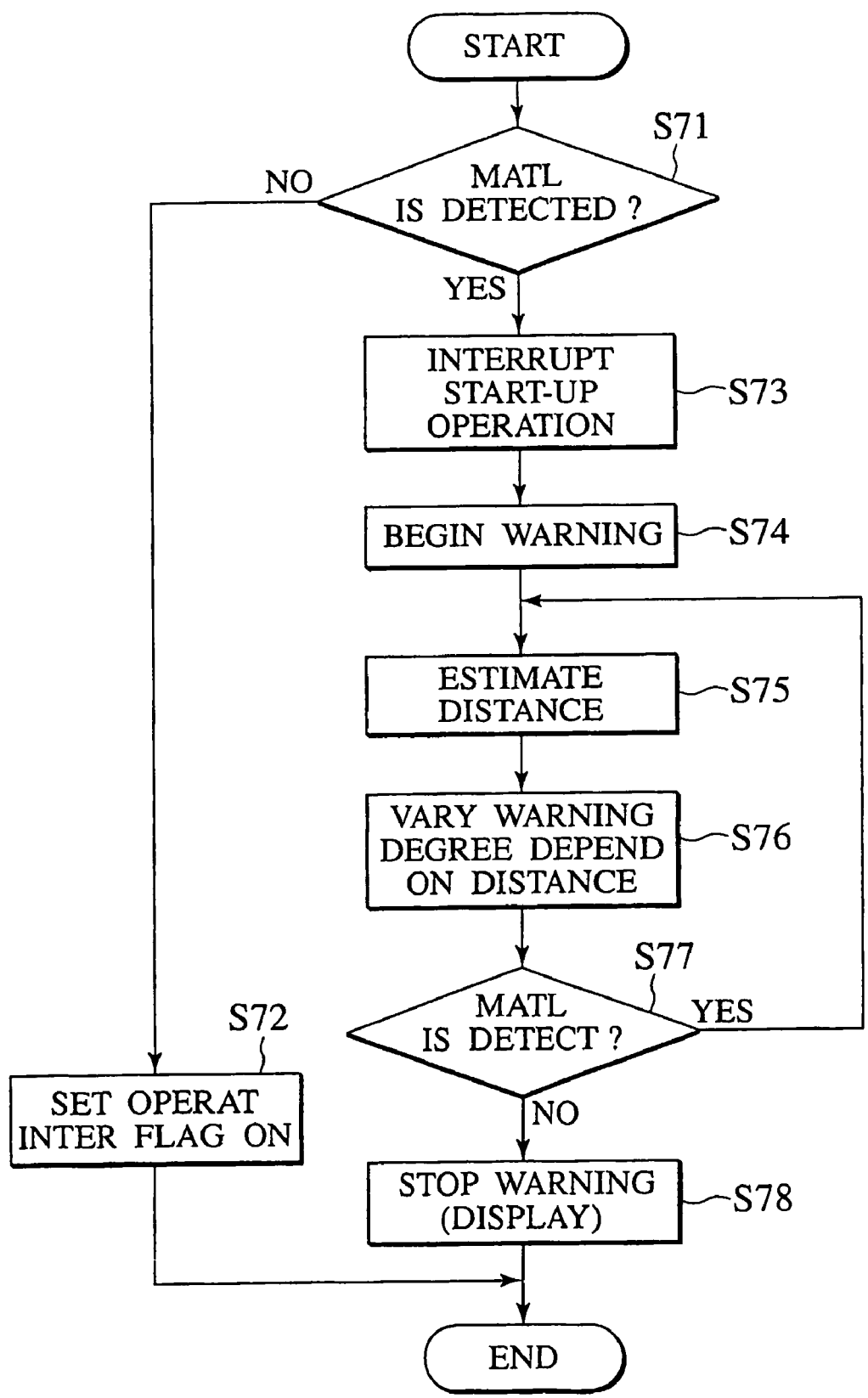

FUEL CELL SYSTEM WITH MULTIPLE WARM-UP MECHANISMS

TECHNICAL FIELD

The present invention relates to a fuel cell system and its related method and, more particularly, to a fuel cell system, installed on a moving object, to commence start-up operation in response to a command remotely executed by a user, and its related method.

BACKGROUND ART

In recent years, a fuel cell favorable in view of environments focuses the spotlight of attention as a power source for a moving object such as an automobile, and development work has been undertaken to provide a fuel cell system adapted to achieve control for electric power generation of a fuel cell.

Especially, as one of those fuel cell systems which attract public attention to be influential as a fuel cell of the moving object, it has been proposed to provide a polymer electrolyte fuel cell (PEFC) with a polymer electrolyte formed with a proton exchange membrane (PEM).

Further, another fuel cell system has been proposed in which, in order to obtain hydrogen as fuel of the fuel cell, a fuel reformer system is installed to separate hydrogen from compound involving hydrogen.

Among these fuel cell systems, particularly, since organic compound, including carbon and hydrogen which form objects to be reformed, has an energy density per volume and an energy density per weight higher than those of hydrogen, considerable studying works and development works have been undertaken with respect to reforming through the use of such organic compound. Because, as organic compound, hydrocarbon fuel includes alkane such as methane, alcohol and ether series or gasoline which take the form of liquid under a normal temperature and normal pressure or under a pressurized condition to provide an ease of handling while a technology of using hydrocarbon as fuel has been established, hydrocarbon fuel is considered to be top-rated as raw material for fuel reforming.

Furthermore, in the fuel cell systems for the moving objects, it has been proposed to provide a fuel cell system in which an electric storage unit such as a secondary battery and a capacitor is installed. In a case that the fuel cell system is installed on the automobile, regenerative power, resulting from a halt of the moving object when in braked condition, is recovered and stored in the electric storage unit to allow the regenerative power to be utilized again as an energy for acceleration, thereby achieving improvement over a fuel consumption efficiency. Also, due to an ability of the electric storage unit to electronically control an overall fuel cell system, the electric storage unit is used as a power supply during a system stoppage with no electric power being generated by the fuel cell, enabling start-up operation of the fuel cell system to be commenced. There are many probabilities in which a secondary battery with a large energy density is incorporated in the electric storage unit.

Japanese Patent Application Laid-Open Publication No. 2002-117876 discloses a fuel cell system with a coolant flow passage provided, for the purpose of warming up a fuel cell, with a heating mechanism to heat coolant during a cold stage of the fuel cell.

Japanese Patent Application Laid-Open Publication No. 2002-198081 discloses a fuel cell system wherein when commencing operation of a fuel-cell fuel gas generating device equipped with an auto-thermal reformer, during warm-up of a reforming reactor including such a reformer and a CO remover unit, the flow rates of fuel and air to be supplied to the reformer during warm-up thereof are increased to promote warm-up of the CO remover unit.

Japanese Patent Application Laid-Open Publication No. 2002-83606 discloses a fuel cell co-generation system wherein a fuel cell is operated on a predetermined time pattern and corrects the predetermined time pattern depending on an electric power pattern that is actually consumed.

Japanese Patent Application Laid-Open Publication No. 2002-50378 discloses a fuel cell system wherein if a secondary battery remains excessively discharged during start-up of an electric-vehicle fuel cell, an external power supply is rendered operative to drive auxiliary units during fuel-cell start-up and catalytic combustion of fuel is used for heating a reformer and coolant.

Japanese Patent Application Laid-Open Publication No. 2002-219926 discloses a control system wherein a command is transmitted from a portable telephone to remotely control an air conditioning unit of a vehicle.

DISCLOSURE OF INVENTION

However, according to studies conducted by the present inventor, the solid polymer fuel cell, having the polymer electrolyte membrane such as the proton exchange membrane, serves to generate an electric power through reaction between fuel gas and oxidizing gas including oxygen and is so constructed as to allow hydrogen in a fuel gas electrode to form the protons that transfer through the polymer electrolyte membrane to an oxidizing gas electrode for reaction with oxidizing gas. Consequently, when in operation of the fuel cell system to allow the fuel cell to generate an electric power, there is a need for humidifying the polymer electrolyte membrane to be kept in a moistened state.

Further, one of the reasons why the solid polymer fuel cell is regarded to be influential as the power source for the moving object resides in an ability of the polymer electrolyte membrane type fuel cell available to operate at a relatively lower temperature in a range of approximately 80° C. than that of the other type of fuel cell. With such a polymer electrolyte membrane type fuel cell, due to occurrence of heat build-up caused by an energy component, which is not taken out as an electricity, of an energy created through reaction between fuel gas and oxidizing gas, there are many probabilities for coolant medium, such as water, and a radiator to be used to allow an operating temperature to be maintained.

Accordingly, with the fuel cell system with a tendency of containing moisture and coolant in the polymer electrolyte membrane to cause the fuel cell to have a large heat capacity, a considerable energy is required in order to develop the temperature from a status, where the temperature of the fuel cell system reaches the atmospheric temperature because of the moving object installed with the fuel cell having been left for a long time period, to an operating temperature range of approximately of 80° C.

Also, although the fuel cell has a capability of generating electric power at the temperature lower than such an operating temperature range, it is hard to take out the rated electric power because of a drop in an activity in reaction between fuel gas and oxidizing gas at the low temperature. Moreover, with moisture contained in the polymer electrolyte membrane being frozen, no proton can transfer through the oxidizing gas electrode, resulting in an incapability of generating electric power. That is, it is probable for warm-up to be needed in order for the fuel cell to be brought into an operative condition, and it is also probable for the fuel cell system to need start-up operation such as warm-up to be executed.

Further, with the fuel cell system in which the fuel reforming system is installed, due to the presence of the temperature range, in which reforming reaction is highly active, remaining at a high level in a range of from 300° C. to 400° C. in terms of methanol and at a temperature greater than 600° C. in terms of gasoline, a situation stands wherein almost no hydrogen is obtained at the low temperature range or a degraded efficiency is resulted, that is, it is possible to obtain only a less amount of hydrogen than that resulting from reaction at a predetermined temperature range. Accordingly, not only warm-up of the above described fuel cell body but also warm-up of the fuel reformer system are required to be adequately performed.

Furthermore, with the fuel cell system in which the secondary battery is installed as the electric storage unit, there are many probabilities for the secondary battery to be used under a state of charge (SOC) falling in a vicinity of 30% to 80% of a total battery capacity. That is, it is considered that the presence of such a secondary battery controlled so as to prevent the SOC from dropping below a value of 30% of a lower limit threshold ensures an energy for re-start-up or to assist a drive force and, further, the presence of control to preclude the SOC from exceeding 80% of an upper limit threshold allows the secondary battery to be used with the room open for recovering regenerative power.

However, it is conceivable that due to the use of an electronic equipment after halt of the vehicle or to occurrence of self discharging taking place in the secondary battery which is left for a long period of time, the SOC is liable to drop below the lower limit threshold. Also, it is conceivable that even if the SOC exceeds the lower limit threshold prior to beginning of start-up operation of the fuel cell, the occurrence of electric power being used for start-up operation causes the SOC to drop below the lower limit threshold.

Under such a situation, it is desired for the secondary battery to be charged, after the fuel cell has begun to generate electric power, before commencing to drive the moving object. This is because of the fact that under a phase where the moving object is driven, that is, traveling of the fuel cell powered automobile is commenced under a condition where the SOC drops below the lower limit threshold, if discharging takes place in the secondary battery to fall in a status with a lowered SOC because of using the electronic equipment with large electric power consumption or assisting the drive force, there is a probability followed by a serious situation in which the fuel cell system is caused to be stopped. That is, with the electric storage unit, it is probable for the secondary battery to need to be charged when in start-up operation of the fuel cell. Also, with the electric storage unit, since the secondary batteries of a large number of types suffer from degradation in performance at the low temperature, it is desirable to perform warm-up.

By the way, here, the fuel cell system disclosed in Japanese Patent Application Laid-Open Publication No. 2002-117876 is so configured such that, when warming up the fuel cell, an electric heater is used as a heating mechanism to heat coolant during a cold status of the fuel cell to allow coolant to be warmed up.

However, as described above, the heat capacity is greatly influenced by coolant and moisture in the fuel cell, and a large amount of electric energy is required for warm-up. That is, with such a fuel cell system, when in drive of the electric heater through the use of electric power of the secondary battery forming the electric storage unit, it is considered that the SOC of the electric storage unit tends to be degraded before warm-up is completed.

Further, Japanese Patent Application Laid-Open Publication No. 2002-117876 discloses a structure wherein combustion heat resulting from combustion of fuel such as methanol is utilized to heat coolant. This is due to the fact that, to begin with, combustion heat of fuel has an increased heat value and an energy supplied from liquid fuel, such as methanol and gasoline, is greater than a capacity of the secondary battery, whereby there is less fear of a so-called energy shortage.

However, with the structure wherein gas as a result of combustion is expelled as it remains high temperature, an unfavorable tendency results in terms of an energy application efficiency. This is because of the fact that heat exchange through gas is generally evaluated to be low in the temperature efficiency and the energy to be consumed tends to be greater than the energy required for warm-up.

Here, another structure may be considered in that in order to allow the heat energy of high temperature gas resulting from combustion of fuel to be transferred to coolant to the maximum extent, a contact surface area between hot gas and the heat exchanger is increased as large as possible and the gas flow passage inside the heat exchanger is formed to be narrow and long. But, a blower and a compressor of large outputs are required to allow a large volume of gas to flow through the gas flow passage, with a resultant increase in an energy, involving energies to be consumed by the blower and the compressor, for warm up.

Further, while the fuel cell system disclosed in Japanese Patent Application Laid-Open Publication No. 2002-198081 warms up the CO remover located relatively downstream in the fuel reformer system using heat resulting from oxidizing reaction of fuel, that is, combustion thereof, the CO remover does not reach the temperature available for operation during warm-up and, hence, reformed gas bypasses the fuel cell and is delivered to an evaporator equipped with the combustor. That is, in the midst of warm-up of the CO remover, no fuel cell is brought into a status available for electric power generation and, therefore, all of electric power required for start-up of the fuel cell is required to be supplied from the other power supply than the fuel cell. Moreover, with such a structure, during start-up of the fuel cell, since the air flow rate is increased, electric power for many air systems is required. That is, it is considered that the SOC of the electric storage unit drops until warm-up is completed.

Further, although the fuel cell system disclosed in Japanese Patent Application Laid-Open Publication No. 2002-83606 is based on the assumption that the fuel cell for stationary use is operated, even in the presence of such a fuel cell installed on the moving object, theoretically, an operation start time available for electric power generation is preliminarily commanded to perform gradual start-up operation, thereby enabling to suppress a drop in the SOC of the electric storage unit.

However, since such a structure strictly presupposes the stationary fuel cell, it cannot be said to be favorable in a case that the operation start time is desired to be arbitrarily commanded or in a case that commercially available electric power cannot always be utilized like a cogeneration system.

Furthermore, the fuel cell system disclosed in Japanese Patent Application Laid-Open Publication No. 2002-50378 merely takes the measure for start-up control in case of the secondary battery remaining excessively discharged and no intension is made of a structure that provides entirely optimum start-up operation to cover the other cases than the above case.

That is, with such a structure, in a case that rapid start-up is not necessarily needed like in a case that the operation start time is preliminarily commanded, no attempt is made to provide start-up operation for achieving charging of the secondary battery through the use of the external power supply and performing heating of the reformer and coolant.

Furthermore, with the fuel cell system disclosed in Japanese Patent Application Laid-Open Publication No. 2002-219926, an attempt to preliminarily operate the fuel cell as an energy source of an air conditioner simultaneously enables warm-up of the fuel cell per se to be completed before operation of the moving object. Also, with such a structure, if the moving object is equipped with the electric storage unit available to be charged or discharged, electric power of the electric storage unit has a priority to be utilized for enabling air conditioning to be achieved and, for the purpose of enabling the electric storage unit to be charged during electric power generation of the fuel cell prior to driving the moving object, control may be executed so as to preclude the electric storage unit from being charged during operation of the moving object.

However, even such a structure is not so constructed as to provide optimum start-up operation of the fuel cell depending on a variety of circumstances.

Therefore, the present invention has been completed upon the studies conducted by the present inventor as set forth above and has an object to provide a fuel cell system and its related method wherein start-up operation of a fuel cell can be completed at an appropriate timing for a user.

To attain the above object, according to one aspect of the present invention, there is a fuel cell system adapted to be installed on a moving object, the fuel cell system comprising: an electric power generating element including a fuel cell supplied with fuel gas and oxidizing gas to generate electric power; a warm-up mechanism enabled to achieve warm up of the electric power generating element; and a controller, in response to reception of a control signal transmitted from an external remote operator unit and commanding a start-up completion time at which start-up of the fuel cell system is to be completed through the warm-up of the electric power generating element, controlling the warm-up mechanism to allow the warm-up of the electric power generating element to be completed in alignment with the start-up completion time.

In other word, according to another aspect of the present invention, there is a fuel cell system, adapted to be installed on a moving object, the fuel cell system comprising: an electric power generating element including a fuel cell supplied with fuel gas and oxidizing gas to generate electric power; a warm-up mechanism enabled to achieve warm up of the electric power generating element; and a controlling means, in response to reception of a control signal transmitted from an external remote operator unit and commanding a start-up completion time at which start-up of the fuel cell system is to be completed through the warm-up of the electric power generating element, for controlling the warm-up mechanism to allow the warm-up of the electric power generating element to be completed in alignment with the start-up completion time.

In the meantime, according to another aspect of the present invention, there is provided a method of controlling a fuel cell system provided with an electric power generating element including a fuel cell supplied with fuel gas and oxidizing gas to generate electric power and a warm-up mechanism achieving warm up of the electric power generating element, the method comprising: controlling the warm-up mechanism, in response to reception of a control signal transmitted from an external remote operator unit and commanding a start-up completion time at which start-up of the fuel cell system is to be completed through the warm-up of the electric power generating element, to allow the warm-up of the electric power generating element to be completed in alignment with the start-up completion time.

Other and further features, advantages, and benefits of the present invention will become more apparent from the following description taken in conjunction with the following drawings.

BRIEF DESCRIPTION OF DRAWINGS

FIG. 2 is a flowchart illustrating main flow of start-up control operation to be executed by the fuel cell system of the first embodiment;

FIG. 3 is a flowchart illustrating start-up operation to be executed by the fuel cell system of the first embodiment;

FIG. 4 is a flowchart illustrating completion-judgment threshold setting processing to be executed by the fuel cell system of the first embodiment;

FIG. 5 is a flowchart illustrating start-up operation-method selecting processing to be executed by the fuel cell system of the first embodiment;

FIGS. 6A to 6C are views for illustrating a time-temperature range for use in start-up operation-method selecting processing with respective abscissa axes indicating the temperature of the fuel cell system and coordinate axes indicating a residual time with respect to a start-up completion set time, in the first embodiment;

FIG. 12 is a flowchart illustrating start-up operation-method selecting processing to be carried out during start-up control operation to be executed by the fuel cell system of the second embodiment;

FIG. 13 is a flowchart illustrating start-up operation-method selecting processing with no combustion of a combustor in the fuel cell system of the second embodiment; and FIG. 14 is a flowchart illustrating fail-off operation to be executed by the fuel cell system of the second embodiment.

BEST MODE FOR CARRYING OUT THE INVENTION

Hereinafter, a fuel cell system and its related method of each embodiment according to the present invention are described in detail with suitable reference to the accompanying drawings.

First Embodiment

First, referring to FIGS. 1 to 9, a fuel cell system and its related method of a first embodiment according to the present invention are described in detail.

Figure 1:
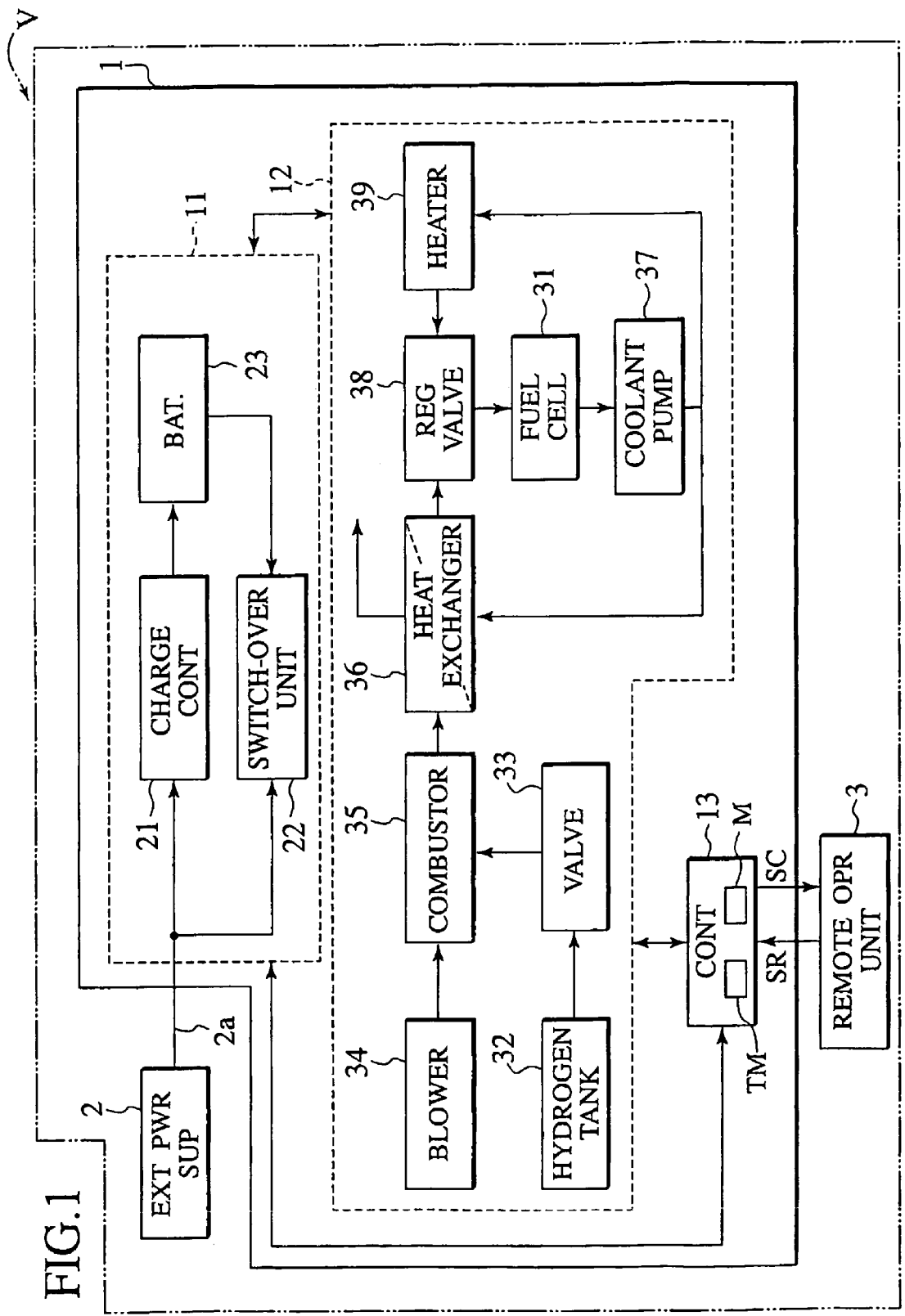
FIG. 1 is a block diagram illustrating a structure of a fuel cell system of a first embodiment according to the present invention while illustrating the relationship between the fuel cell system, and an external power supply and a remote operator unit.

FIG. 1 is a block diagram illustrating a structure of the fuel cell system 1 of the presently filed embodiment and also illustrating the relationship between the fuel cell system, and an external power supply and a remote operator unit.

Structure of Fuel Cell System 1

As shown in FIG. 1, the fuel cell system 1 is installed on a moving object V such as an automobile and generates electric power as a power source of the moving object for supplying the electric power to its drive motor, which is not shown. The fuel cell system 1 is connected to the external power supply 2 through a cable 2a and, further, electrically connected through radio communication to the remote operator unit 3 that is to be held by a user.

Such a remote operator unit 3 includes, though not shown, an input section operated by the user, a transmitter and receiver section that transmit and receives radio signals to and from the fuel cell system 1, a display for providing the user with a display of various information, an information provider section having such as a speaker and a vibration mechanism, and a controller that controls various functions for these purposes. The controller of the remote operator unit 3 is responsive to the input section being operated by the user and serves to transmit a control signal SR (with the signal transmitted from the controller of the remote operator unit 3 being typically hereinafter designated at SR for the sake of convenience) depending upon an operational content by the user, thereby activating and operating the fuel cell system 1. Also, the controller of the remote operator unit 3 controls the provider section in accordance with a control signal SC (with signals transmitted from the controller, to be described later, of the fuel cell system 1 being typically hereinafter designated at SC for the sake of convenience) outputted from the fuel cell system 1, thereby providing the user with various information related to the fuel cell system 1.

Further, the fuel cell system 1 includes a charging control section 11 equipped with a connector, not shown, which is electrically connected to the cable 2a extending from the external power supply 2.

The charging control section 11 is comprised of a charging controller 21 and a switch-over unit 22, both of which are connected to the external power supply 2 through the cable 2a and the connector. The charging controller 21 controls electric power supplied from the external power supply 2 to allow the electric power to be charged to a battery 23 while adjusting a charging rate of the electric power. Moreover, the switch-over unit 22 is connected to a start-up power source line, whose details are not shown, and controllably carries out switch-over between electric power delivered from the battery 23 and the electric power delivered from the external power supply 2 to be supplied to various parts of the fuel cell system 1. In particular, the switch-over unit 22 delivers typically either one of the electric power from the external power supply 2 and the electric power from the battery 23, or combination of the electric power from the external power supply 2 and the electric power from the battery 23 to the various parts of the fuel cell system 1.

Further, the fuel cell system 1 includes a fuel cell operating section 12 that generates the electric power serving as the power source of the moving object.

The fuel cell operating section 12 includes a fuel cell stack 31 (sometimes called as merely a fuel cell) that is supplied with fuel gas and oxidizing gas and generates the electric power. The fuel cell stack 31 forms an electric power generating element that is, though not shown, constructed of a plurality of stacks of fuel cell structural bodies, with each cell structure including an air electrode and a fuel electrode disposed in opposition thereto between which a solid polymer electrolyte membrane is sandwiched, which are sandwiched between separators. For the purpose of permitting the fuel cell stack 31 to cause electric power generating reaction, fuel gas such as hydrogen gas is supplied to the fuel electrode and oxidizing gas such as air is supplied to the oxidant electrode.

More particularly, during normal operation of the fuel cell system 1, hydrogen gas stored in a hydrogen tank 32 is supplied to the hydrogen electrode (fuel electrode) of the fuel cell stack 31 through a hydrogen valve 33 under a condition wherein a hydrogen flow rate and hydrogen pressure are regulated. Also, in addition to the hydrogen gas being supplied, the air electrode of the fuel cell stack 31 is supplied with air from a blower 34.

During processing of the fuel cell system 1 for start-up operation, the blower 34 delivers the air to a combustor 35. During the normal operation of the fuel cell system 1, the combustor 35 catalytically combusts hydrogen contained in exhaust gas expelled from the hydrogen electrode of the fuel cell stack 31. A system from the hydrogen tank 32 to the combustor 35 with intervening the hydrogen valve 33 forms a fuel supply system. Also, during the processing of the fuel cell system 1 for start-up operation, the combustor 35 allows the hydrogen gas delivered through the hydrogen valve 33 and the air delivered from the blower 34 to react one another to provide high pressure gas that in turn is fed to a heat exchanger 36.

The heat exchanger 36 is connected to the combustor 35 through a gas conduit and connected to a coolant pump 37 through a coolant delivery conduit. During the start-up operation of the fuel cell system 1, the heat exchanger 36 carries out heat exchange between the high pressure gas delivered from the combustor 35 and coolant delivered from the coolant pump 37 under pressure, with the coolant that is heat exchanged being delivered to a regulator valve 38 through the coolant delivery conduit.

The coolant pump 37 is supplied with the coolant, which has passed through a coolant flow passage, not shown, inside the fuel cell stack 1 and delivers the coolant to the heat exchanger 36 and a heater 39 under pressure. Here, a drive rate of the coolant pump 37 is controlled so as to allow the coolant, which is delivered under pressure, to pass through the heat exchanger 36, the regulator valve 38 and the fuel cell stack 31 for circulation and to allow the coolant to pass through the heater 39, the regulator valve 38 and the fuel cell stack 31 for circulation. Here, the coolant pump 37, the heat exchanger 36, the regulator valve 38 and the fuel cell stack 31 forms one circulation system, and the coolant pump 37, the heater 39, the regulator valve 38 and the fuel cell stack 31 also form another circulation system.

The heater 39 is connected to the switch-over unit 22 through the start-up electric power line, whose details are not shown, to be supplied with the electric power supplied thorough the switch-over unit 22 to heat the coolant delivered from the coolant pump 37, with the heated coolant being delivered to the regulator valve 38.

The regulator valve 38 is supplied with the coolant, which is heat exchanged with the high pressure gas in the heat exchanger 36, and the coolant, which is heated by the heater 39, thereby regulating flow rates of the respective coolant streams to be delivered to the fuel cell stack 31.

Further, the fuel cell system 1 includes a controller 13 that controls the operations of the charging control section 11 and the fuel cell operating section 12.

The controller 13 is comprised of a memory M, in which various information are stored, and a timer TM by which time is counted, and controls the operations of the charging controller 21 and the switch-over unit 22 of the charging control section 11, and the blower 34, the hydrogen valve 33, the heat exchanger 36, the regulator valve 38 and the heater 39 of the fuel cell operating section 12, in accordance with the control signal SR from the remote operator unit 3. By so doing, when warming up the fuel cell stack 1 for the start-up, the controller 13 executes start-up control operation so as to execute selection between start-up operation to be carried out through the heat exchanger 36 with the use of combustion of the combustor 35 and start-up operation through the use of heat developed by the heater 39, serving as a warm-up mechanism and being energized by the electric powers delivered from the external power supply 2 and the battery 23. Here, the hydrogen tank 32, the hydrogen valve 33, the blower 34, the combustor 35, the heat exchanger 36, the regulator valve 38 and the coolant pump 37 form one warm-up mechanism, and the battery 23, the charging controller 21, the switch-over unit 22, the heater 39, the regulator valve 38 and the coolant pump 37 also form another warm-up mechanism.

Start-Up Control Operation of Fuel Cell System 1

Next, main flow of start-up control operation to be executed by the controller 13 of the fuel cell system 1 with such a structure set forth above is described with reference to FIG. 2. Also, the start-up control operation of the presently filed embodiment substantially indicates operation that warms up the fuel cell stack 31 during the start-up of the fuel cell system 1, and for the sake of convenience, in the presently filed embodiment, it is treated that the start-up has been completed at a timing at which the warm-up of the fuel cell stack 31 has been completed.

Upon receipt of the control signal SR involving a start-up instruction and a start-up completion time, which is the time at which the start-up operation is to be completed, from the remote operator unit 3, the controller 13 commences steps subsequent to step S1 as shown in FIG. 2. In particular, the controller 13 sets the start-up completion time, designated by the remote operator unit 3, to the timer TM, internally provided in the controller 13 to count the time, thereby allowing the processing, subsequent to step S1, to be commenced at the time that traces back with respect to the start-up completion time by a predetermined time interval (such as several tens seconds to several minutes), which is required for the start-up operation.

First in step S1, system check is carried out to execute operation to detect a SOC of the battery 23 and to discriminate to find whether the SOC exceeds a lower limit threshold and operation to discriminate to find whether the various parts forming the charging control section 11 and the fuel cell operating section 12 are normally operative. In the presence of discrimination that the fuel cell system 1 is normal, processing proceeds to step S2. Also, if discrimination is made that the fuel cell system 1 is abnormal, current operation is terminated.

In succeeding step S2, the controller 13 executes start-up operation-method selecting processing, to select a method to start up the fuel cell system 1, in dependence on various conditions such as temperature and time related to start-up operation, and processing proceeds to step S3. Also, operational content of such start-up operation-method selecting processing is described later.

In consecutive step S3, the controller 13 executes the start-up operation method selected in step S2, such that the start-up of the fuel cell system 1 is completed in alignment with the start-up completion time, typically substantially on the start-up completion time, and current operation is terminated. Also, if the start-up completion time has been altered and set in response to the control signal SR from the remote operator unit 3, in the controller 13, processing is routed back to step S2 and selection for the start-up operation method is executed again. Further, operational content of the start-up operation in step S3 is described later.

Moreover, it may be structured such that, when in such start-up control operation, the start-up of the fuel cell system 1 is completed in alignment with a predetermined time (a time, such as, at eight o'clock in the morning), at which the moving object is usually utilized by the user, by using the timer incorporated in the controller 13.

Start-Up Operation

Next, the start-up operation to be executed in step S3 during the above-described start-up control operation is described with reference to FIG. 3.

As shown in FIG. 3, during such start-up operation, first in step S11, the controller 13 executes completion-judgment threshold setting processing to set a completion-judgment threshold (a value related to a status of the fuel cell 31 such as temperature) for enabling judgment to find whether the start-up of the fuel cell system 1 has been completed, and processing is routed to step S12. Here, the controller 13 operates to set the completion-judgment threshold for the start-up processing in accordance with the user's command in accordance with the control signal SR from the remote operator unit 3. Also, operational content of such completion-judgment threshold setting processing is described later.

In succeeding step S12, the controller 13 discriminates to find whether command content, such as the start-up completion time, that is, the time at which the start-up operation is to be completed, has been altered, in response to the control signal SR from the remote operator unit 3, whereupon if judgment results with no alteration, processing is routed to step S13. That is, with the controller 13, after judgment has been made that there is no alteration in the command content such as the time at which the start-up operation is completed, the charging control section 11 and the fuel cell operating section 12 are controlled, thereby commencing the start-up operation of the fuel cell system 1. Here, "alteration of the command content such as the time at which the start-up operation is completed" typically means altering time such that the user advances or retards the start-up completion time. In the meantime, if judgment is made that the command content such as the time to complete the start-up has been altered, processing is routed to step S18.

In consecutive step S13, the controller 13 executes comparison between the completion-judgment threshold preset in step S11 and a current status of the fuel cell system 1 to execute judgment to find whether the current status of the fuel cell system 1 lies at the completion-judgment threshold, while discriminating to find whether there is a user command in the form of the control signal SR delivered from the remote operator unit 3 so as to interrupt the start-up of the fuel cell system 1. When discrimination is made by the controller 13 that no user command exists for interrupting the start-up of the fuel cell system 1 and no condition takes place for the current status of the fuel cell system 1 to lie at the completion-judgment threshold, processing is routed to step S12 with a view to permitting the start-up operation of the fuel cell system 1 to be continued. Further, if discrimination is made by the controller 13 that no user command exists for interrupting the start-up of the fuel cell system 1 and the current status of the fuel cell system 1 lies at the completion-judgment threshold, then judgment is made that the start-up operation of the fuel cell system 1 has been completed and processing proceeds to step S14. On the contrary, in the presence of the user command to interrupt the start-up operation of the fuel cell system 1, processing is routed to step S16.

In subsequent step S14, the controller 13 counts a time elapsed after completion of the start-up has been judged in step s13 and monitors operations of the various parts in the moving object, thereby monitoring to find whether drive of the moving object is commenced within a predetermined time interval (such as for fifteen minutes). If judgment is made that drive of the moving object has been commenced within the predetermined time interval, processing is routed to step S15, whereupon setting of normal end flag, indicative of the start-up operation of the fuel cell system 1 being normally completed, is set to "ON" and such processing is terminated. In contrast, if judgment is made by the controller 13 that drive of the moving object is not commenced for a predetermined time interval from the time elapsed after judgment of the start-up operation being completed, processing is routed to step S16.

Moreover, it is preferred that, after the start-up has been completed, the elapsed time is counted while measuring or estimating the temperature of the fuel cell system 1 and the various parts of the fuel cell system 1 are controlled so as to execute the warm-up operation of the fuel cell system 1 at needs. Also, if the external power supply 2 is available and capable of selling the electric power to the external power supply 2, the controller 13 carries out normal operation of the fuel cell stack 31 by which the electric power may be generated and supplied to the external power supply 2. Of course, if the user alters the time to delay the start-up completion time, it can be so arranged as to allow the electric power, generated by the fuel cell stack 31 until the start-up operation has been completed, to be supplied to the external power supply 2.

By the way, in step S16 subsequent to judgment in step S13 to interrupt the start-up operation, or subsequent to judgment in step S14 that no drive of the moving object is commenced, the controller 13 controls the fuel cell operating section 12 so as to allow the same to execute fail-off operation and processing is routed to step S17. Such fail-off operation renders the fuel cell 31 inoperative to perform electric power generating operation, for example, if the combustor 35 is used during the start-up operation, the controller 13 monitors a signal of a temperature sensor, which is not shown, and confirms that the temperature of the combustor 35 remains at a value with no hindrance as to the combustor 35 or the like, whereupon control is made so as to interrupt operation of the blower 34.

In next step S17, upon operation of the controller 13, abnormal end flag is set to "ON" and such processing is terminated.

Further, in step S18 subsequent to step S12 in which judgment is made that the command content requested by the user command has been altered, the controller 13 discriminates to find whether there is a need for altering the start-up operation method preset in step S2. Here, the "user command" means such as a request to alter time to advance or retard the start-up completion time, and if judgment is made by the controller 13 that no alteration of the start-up operation method is required, that is, when merely retarding the start-up completion time, processing is routed back to step S11. When processing is routed back from step S18 to step S11, the controller 13 executes processing to alter the completion-judgment threshold in dependence on the alteration effectuated by the user command. On the contrary, if judgment is made in step S18 that there is a need for altering the start-up operation method, processing is routed to step S19 and the controller 13 sets operation alteration flag to "ON", whereupon processing is routed back to step S2.

Completion-Judgment Threshold Setting Processing

Next, a description is made of the completion-judgment threshold setting processing to be executed in step S11 during the above-described start-up operation with reference to FIG. 4. Also, in the following description of the completion-judgment threshold setting processing, the temperature of the fuel cell system 1 is typically used as the completion-judgment threshold, and a description is made of a case where a coolant sensor, not shown, is disposed in the coolant delivery conduit. Moreover, a time threshold, which is described later, is set in response to the control signal SR delivered from the remote operator unit 3.

Here, although there are many probabilities for the fuel cell stack 31 equipped with the polymer membrane to exhibit the maximum electric power generation capability normally at a temperature in the vicinity of 80° C., in principle, electric power generation can be carried out at a temperature lower than the above value. However, if the fuel cell stack 31 remains at a low temperature, a degraded reacting activity occurs between the hydrogen gas and the air and degradation occurs in the maximum amount of the electric power generation and an efficiency thereof, resulting in heat build up due to a component, which does not contribute the electric power generation, of a reacting energy between the hydrogen gas and the air.

This means that, if the electric power needed for traveling of the moving object is less than the maximum amount of generated the electric power, or if the electric power is supplied form the battery 23 to enable the moving object to sufficiently travel, the fuel cell stack 31 can be operated at a lower temperature than that of a temperature range in which normal rated power is generated. That is, for the purpose of causing a heat developed in the fuel cell stack 31 not to be dissipated through a radiator, which is not shown, disposed in the coolant flow passage, the coolant is circulated in a way to bypass the radiator, providing a capability of warming up the fuel cell stack 31 due to self heat generation. As a consequence, during the start-up of the fuel cell system 1, it becomes possible to achieve the warm up through the use of heat that would be wasted during normal operation after the warm-up.

Further, such completion-judgment threshold setting processing is described later in conjunction with a case where the fuel cell system 1 is installed on the automobile as the moving object, which is mainly used for traveling daily back and forth to work and the moving object is commenced to be driven under a condition where the fuel cell stack 31 is warmed only up to a relatively low temperature like in a situation where the moving object travels in a traveling pattern, on a flat urban road, with a small number of passengers and a small number of baggage. Such a traveling pattern of the moving object is stored in the controller 13 as a history of travel-requisite electric power. In particular, a traveling pattern, associated with a time interval approximate from the beginning of travel of the moving object to the end of the warm-up effectuated by heat build-up of the fuel cell stack 31, is stored in the controller 13. Also, it is needles to say that no limitation is intended to such a traveling mode.

As shown in FIG. 4, during such completion-judgment threshold setting processing, first in step S21, the controller 13 execute judgment in response to the control signal SR delivered from the remote operator unit 3 to find whether the start-up operation method is altered by the user. If judgment is made that the start-up operation method is altered, processing is routed to step S24, and if judgment is made that the start-up operation method is not altered, processing is routed to step S22.

In next step S24, because of user's anticipation that there is a need for increased the electric power output immediately after the moving object has begun to be driven, if the controller 13 receives the control signal SR, including a command to alter the start-up operation method, from the remote operator unit 3, the controller 13 responds to such a command to set a completion-judgment temperature threshold to a high temperature, and such processing is terminated.

On the contrary, in step S22 subsequent to step S21 wherein judgment is made that the start-up operation method is not altered, the SOC of the battery 23 is detected. If the detected SOC is found to reach a predetermined value (e.g., a value of 30%), processing proceeds to step S23 wherein the completion-judgment temperature threshold is set to a low temperature in accordance with the traveling pattern that has been stored and such processing is terminated. This is because of the fact that, if a demand occurs for the electric power that exceeds the maximum magnitude of the electric power generated by the duel cell stack 31 in the midcourse of the warm-up especially when no adequate warm-up of the fuel cell stack 31 takes place, demanded electric power is supplied from the battery 23 and the electric power per se generated by the fuel cell stack 31 is charged into the battery 23. In contrast, if the SOC of the battery 23 does not reach a predetermined value, processing is routed to step S24 wherein the completion-judgment temperature threshold is set to an increased value, whereupon such processing is terminated.

Start-Up Operation-Method Selecting Processing

Next, the start-up operation-method selecting processing to be executed in step S2 during the above-described start-up control operation is described with reference to FIG. 5.

As shown in FIG. 5, during such start-up operation-method selecting processing, first in step S31, the controller 13 discriminates to find whether the external power supply 2 is available for supplying the electric power from the external power supply 2 to the battery 23 and, if an availability is found, processing is routed to step S32, whereas if judgment is made that no availability is found, processing is routed to step S33. When this takes place, at the same time, the controller 13 discriminates to find whether the external power supply 2 and the charging control section 11 are connected to one another through the cable 2a and the connector.

In next step S32, the controller 13 controls the charging control section 21 so as to allow the electric power delivered from the external power supply 2 to be charged into the battery 23, and processing is routed to step S33. When this takes place, the controller 13 allows an SOC upper-limit threshold, used in the start-up control operation, to be set to a higher value than the SOC upper-limit threshold used in the travel of the moving object. By so doing, for example, when the moving object has begun to travel and heat is built up in the fuel cell stack 31, and even in the presence of a request to supply the electric power greater than the maximum amount of the electric power that can be generated by the fuel cell stack 31 under the condition in which the heat build-up in the fuel cell stack 31 is maintaining, the switch-over unit 22 is operated to make it possible to reliably supply the electric power from the battery 23 to the drive motor of the moving object.

In succeeding step S33, the controller 13 discriminates to find whether a residual time from the current time to the start-up completion time (hereinafter indicated as the residual time with respect to the start-up completion time) is less than a first time threshold that is preliminarily determined and, if judgment is made that the residual time with respect to the start-up completion time is not less than the first time threshold, processing is routed to step S34, whereas if judgment is made that the residual time with respect to the start-up completion time is less than the first time threshold, processing is routed to step S35.

In consecutive step S35, the controller 13 discriminates to find whether the temperature of the fuel cell system 1, i.e., typically, the temperature of the fuel cell stack 31 is lower than a first temperature threshold and, if judgment is made that the relevant temperature is not lower than the first time threshold, processing is routed to step S34, whereas if judgment is made that the relevant temperature is lower than the first temperature threshold, processing is routed to step S36. When this takes place, the controller 13 may transmit the start-up completion time and the residual time with respect to the start-up completion time to the remote operator unit 3 if desired.

In succeeding step S36 subsequent to judgment that the residual time with respect to the start-up completion time of the fuel cell system 1 is lower than the first time threshold and at the same time the temperature of the fuel cell system 1 is lower than the first temperature threshold, the controller 13 selects the start-up operation method to cause the combustor 35 to produce high temperature gas for heating the coolant together with heat built up by the heater 39.

In contrast, subsequent to judgment that the residual time with respect to the start-up completion time of the fuel cell system 1 is not lower than the first time threshold, the controller 13 selects the other start-up operation method to heat the coolant using heat built up by the heater 39 without depending upon combustion of the combustor 35. Also, an operational content of this step S34 is described later.

Here, although the fuel cell stack 31 is able to generate the electric power at a lower temperature, in more or less, than that of the temperature range where the fuel cell stack 31 is available to operate for generation of the rated electric power, the presence of a situation in which a circumference of the fuel cell system 1 is less than a freezing point and moisture contained in the polymer electrolyte membrane is frozen renders the fuel cell stack 31 to fall in a status to unable to generate the rated electric power. In such a case, if an attempt is made to utilize the electric power delivered from the external power supply 2 with a lower current capacity than that of the battery 23 and to heat build up in the heater 39 for thereby heating the coolant, a probability occurs wherein it takes time for warming up the fuel cell stack 31 to the predetermined temperature (of several tens ° C.). On the contrary, since combustion of the combustor 35 exhibits a remarkable heating value, the use of such combustion to heat the coolant for effectuating the warm-up of the fuel cell stack enables the warm-up to be completed in a short period of time.

Accordingly, it is considered to be appropriate for the controller 13 to suitably select the start-up operation method with combustion in a case that the residual time with respect to the start-up completion time of the fuel cell system 1 is short and the temperature of the fuel cell system 1 remains at a low level.

FIGS. 6A to 6C are views illustrating characteristics of time-temperature range to be used in such start-up operation-method selecting processing.

More particularly, FIG. 6A represents a case where, during the start-up operation like the warm-up of the fuel cell stack 1 before the rated electric power is taken out from the fuel cell stack 31, a time-temperature range A corresponds to a status the residual time with respect to the start-up completion time of the fuel cell system 1 is shorter than the first time threshold and the temperature of the fuel cell system 1 is lower than the first temperature threshold and, in the time-temperature range A, the coolant is heated using combustion heat of the combustor 35, whereas in a time-temperature range B outside the time-temperature range A, the coolant is heated using only heat of the heater 39.

Further, if either a judgment result in step S33 or a judgment result in step S35 are found to be "YES", that is, if the residual time with respect to the start-up completion time of the fuel cell system 1 is shorter than the first time threshold, which is preliminarily determined, or the temperature of the fuel cell system 1 is lower than the first temperature threshold, the coolant may be heated up using combustion heat of the combustor 35 and, as shown in FIG. 6B, time thresholds and temperature thresholds are set in two kinds, respectively, with the time-temperature range A, where combustion heat of the combustor 35 is utilized, being set to be widened to allow the time-temperature range B, where only heat of the heater 39 is utilized, to be narrowed. Additionally, as shown in FIG. 6C, an attempt may be made to allow the relationship of the temperature of the fuel cell system 1 to be preliminarily tabled in terms of the residual time with respect to the start-up completion time such that the time-temperature ranges A, B may be determined so as to continuously vary the relationship between the time threshold and the temperature threshold.

Next, a processing sequence, in step S34, of the controller 13 without the use of combustion heat of the combustor 35 is described with reference to a flowchart of FIG. 7.

Figure 7:
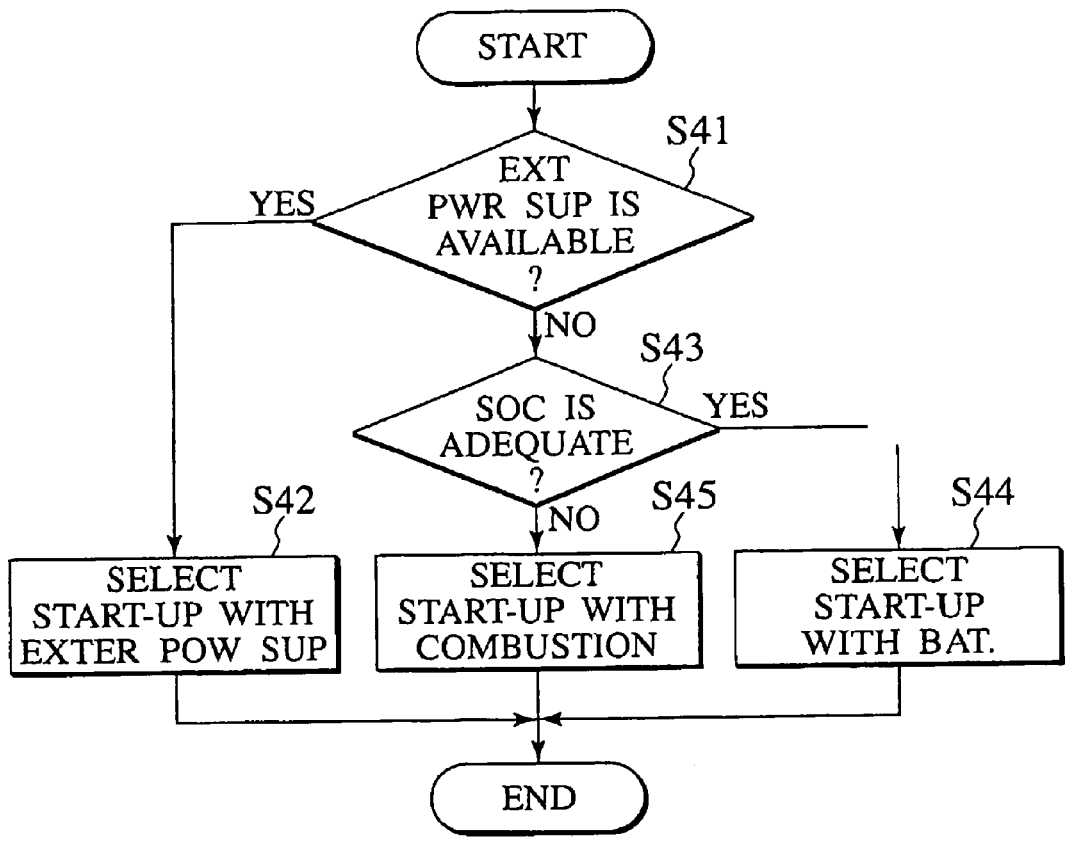
FIG. 7 is a flowchart illustrating start-up operation-method selecting processing with no combustion of a combustor in the fuel cell system of the first embodiment.

As shown in FIG. 7, if judgments in step S33 or step S35 are found to be "NO", that is, if the residual time with respect to the start-up completion time of the fuel cell system 1 is not shorter than the first time threshold, which is preliminarily determined, or the temperature of the fuel cell system 1 is not lower than the first temperature threshold, processing in step S41 is commenced to discriminate to find whether the external power supply 2 is available for supplying the electric power from the external power supply 2 to the warm-up mechanism. If judgment is made that the external power supply 2 is available, processing is routed to step S42. In contrast, if judgment is made that the external power supply 2 is unavailable, processing is routed to step S43.

In step S42 subsequent to judgment made in step S41 that the external power supply 2 is available, the controller 13 selects the start-up operation method in which the heater 39 generates heat using the external power supply 2.

On the contrary, in step S43 subsequent to judgment made in step S41 that the external power supply 2 is unavailable, the SOC of the battery 23 is detected to allow detected SOC to be compared to estimated start-up electric power, and the controller 13 discriminates to find whether, even if the estimated the start-up electric power is taken out from the battery 23, residual electric power does not drop below a predetermined SOC lower limit threshold (of 30%).

That is, if judgment is made by the controller 13 in step S43 that the residual electric power does not drop below the predetermined SOC lower limit threshold, processing is routed to step S44 to select the start-up operation method in which the switch-over unit 22 is controlled so as to allow the heater 39 to develop heat through the use of the battery 23, and such processing is terminated.

In contrast, if judgment is made by the controller 13 in step S43 that the residual electric power drops below the predetermined SOC lower limit threshold, processing is routed to step S45 to select the start-up operation method in which only combustion heat of the combustor 35 is utilized to heat the coolant, and such processing is terminated.

Further, in the start-up operation-method selecting processing shown in FIG. 5, an attempt is made to select the start-up operation method in which if the residual time with respect to the start-up completion time of the fuel cell system 1 and the temperature of the fuel cell system 1 are less than the respective thresholds, the start-up is initiated through the use of the combustion heat of the hydrogen, whereby if the time threshold, which is shorter than the first time threshold, and the temperature threshold, which is lower than the first temperature threshold, are determined and the relevant values drop below such shortened time threshold and the lowered temperature threshold, i.e., even if request is made from the remote operator unit 3 to rapidly complete the start-up from the low temperature condition, processing shown in FIG. 7 can be executed to select the start-up operation method. By so doing, the coolant can be heated up through the use of developed heat of the heater 39 utilizing the external power supply 2 or the battery 23, and the hydrogen combustion heat.

Further, although in the start-up operation-method selecting processing shown in FIG. 7, the electric power from the external power supply 2 has a priority over the electric power from the battery 23 when in use, in a case that request is made for rapid start-up completion through heating of the coolant using the electric power combined with heating of the coolant using combustion heat, it may be possible for the controller 13 to control the switch-over unit 22 to allow the electric power of the battery 23, from which larger electric current can be outputted, to be used with a priority over the electric power of the external power supply 2.

Here, if selection is made of the start-up operation method in which the coolant is heated using the hydrogen combustion heat, the controller 13 controls the coolant pump 37 and the hydrogen valve 33 such that the flow rate of the coolant and the fuel flow rate of the hydrogen gas, respectively serving as heat medium, are regulated. That is, the controller 13 controls the discharge flow rate of the coolant and the hydrogen flow rate in dependence on the residual time with respect to the start-up completion time of the fuel cell system 1 and the temperature of the fuel cell system 1 such that the larger the difference between the temperature of the fuel stack 31 and the temperature of the completion judgment threshold with the residual time with respect to the start-up completion time being short, the larger will be the hydrogen flow rate and the coolant flow rate.

Figure 8:
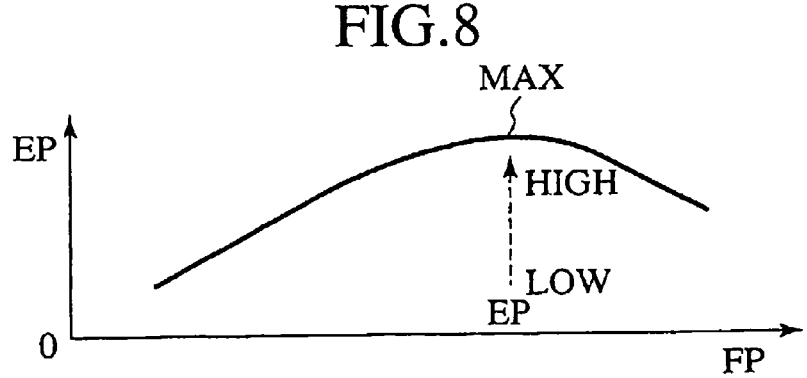
FIG. 8 is a view illustrating the relationship between a coolant flow rate and an efficiency to describe an efficiency of a coolant pump with an abscissa axis indicating coolant flow rate FP and a coordinate axis indicating a pump efficiency EP, in the first embodiment.
Figure 9:
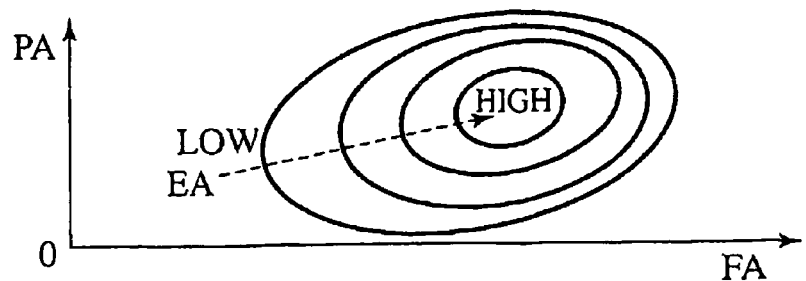
FIG. 9 is a view illustrating the relationship between an air flow rate and a pressure ratio to describe an efficiency of a blower with an abscissa axis indicates an air flow rate FA and a coordinate axis indicates a blower efficiency EA, in the first embodiment.

Also, although a large volume of the air is required to be supplied to the combustor 35 from the blower 34 in order for an increased volume of the hydrogen to be combusted in the combustor 35, the efficiency EP of the coolant pump 37 in terms of the coolant flow rate FP increases as the flow rate increases up to a certain flow rate and takes the maximum value MAX, as shown in FIG. 8. In the meantime, the blower 34 probably also has an operational area in which the efficiency EA of the blower 34 increases as indicated in contours of efficiency curves of the blower 34 in consideration of the air flow rate FA in terms of the air pressure ratio PA shown in FIG. 9. In view of the presence of the operational areas where the efficiencies EA, EP become high, the controller 13 takes the operating regions, where the blower 34 and the coolant pump 37 lie at the high efficiencies, as optimum operating regions, and controllably drives these components in such operating regions. Moreover, since electric power consumptions of the blower 34 and the coolant pump 37 increase with increases in the air flow rate and the coolant flow rate, when in operation to drive the blower 34 and the coolant pump 37 using the external power supply 2, the controller 13 regulates the efficiencies of the blower 34 and the coolant pump 37 also in consideration of the electric power to be available from the external power supply 2.

Second Embodiment

Next, referring to FIGS. 10 to 14, a fuel cell system and its related method of a second embodiment according to the present invention are described in detail.

Figure 10:
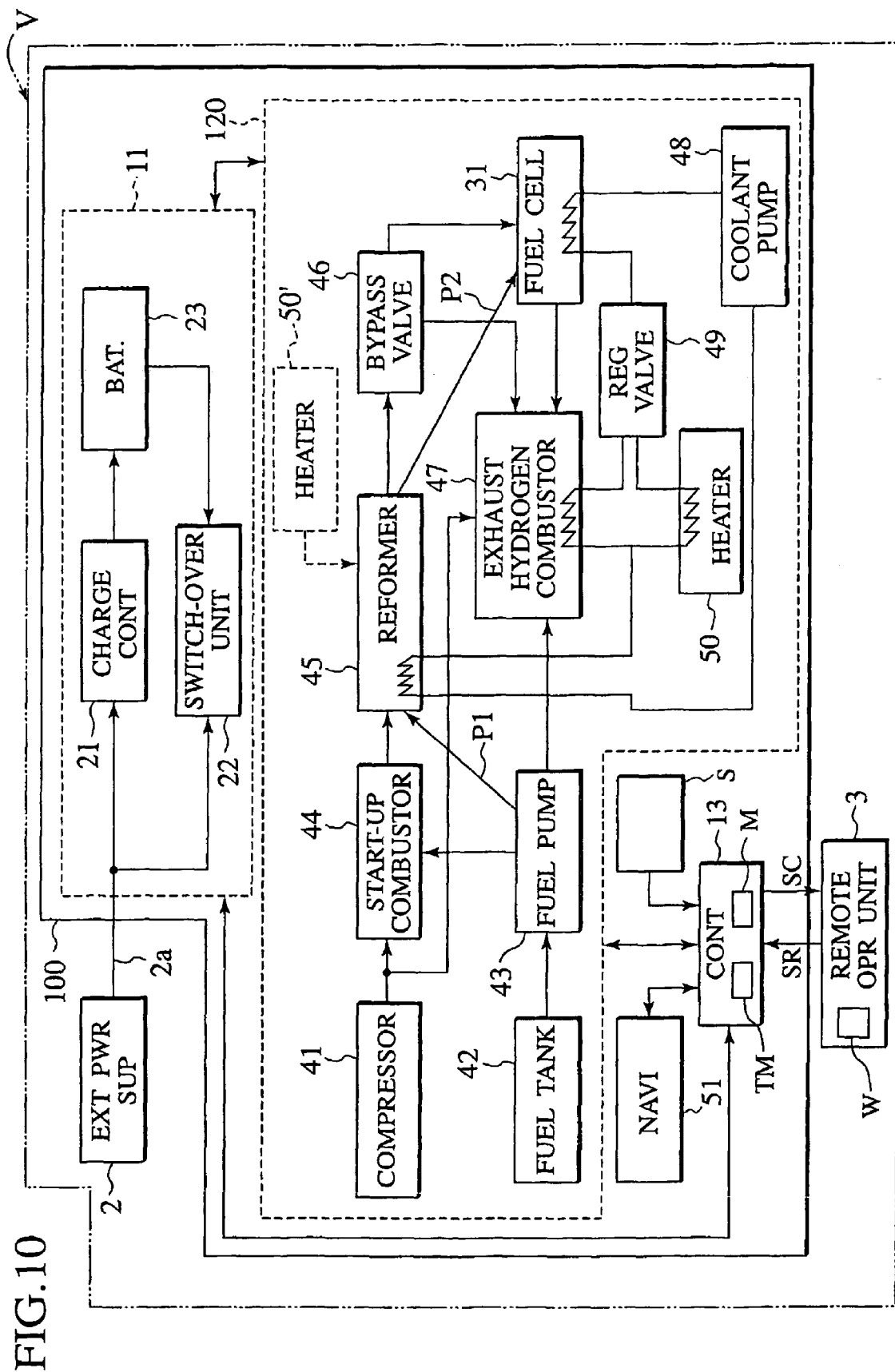
FIG. 10 is a block diagram illustrating a structure of a fuel cell system of a second embodiment according to the present invention while illustrating the relationship between the fuel cell system, and an external power supply and a remote operator unit.

FIG. 10 is a block diagram illustrating a structure of a fuel cell system 100 of the presently filed embodiment while showing the relationship between the fuel cell system, and an external power supply and a remote operator unit. Also, a fuel cell operating section 120 of the presently filed embodiment differs from that of the first embodiment and, in view of such differential aspect, the same component parts and operations as those of the first embodiment bear the like reference numerals with description being predetermined in a suitably simplified form or omitted.

Structure of Fuel Cell System 100

The fuel cell system 100 of the presently filed embodiment includes the fuel cell operating section 120 which has a reformer 45 that reforms fuel such as gasoline to form hydrogen rich reformed gas, as fuel gas, of the fuel cell stack 31. The warm-up of the reformer 45 is fundamentally performed in a manner similar to that of the fuel cell 31 described in conjunction with the first embodiment and, therefore, description of such warm-up of the reformer 45 is suitably simplified or omitted with particular explanation being made with reference to aspects peculiar to the presently filed embodiment. Also, in the presently filed embodiment, the fuel cell 31 and the reformer 45 are referred to as an electric power generating element for the sake of convenience.

More particularly, in the fuel cell system 100, during a start-up mode, a start-up combustor 44 is supplied with air delivered from a compressor 41 under pressure and fuel (gasoline) drawn out from the fuel tank 42 through the fuel pump 43, allowing combustion of fuel to take place in the start-up combustor 44 to form high temperature gas. High temperature gas is fed to the reformer 45 from the start-up combustor 44, thereby the warming up the reformer 45. Here, when in the start-up of the fuel cell system 100, the compressor 41 and the fuel pump 43 are controlled by the controller 13. Also, the fuel tank 42, the compressor 41 and the start-up combustor 44 form a warm-up mechanism for the reformer 45.

High temperature gas passing through the reformer 45 is delivered through a bypass valve 46 to the fuel cell stack 31 or an exhaust hydrogen combustor 47. When this takes place, the bypass valve 46 is controllably opened or closed in accordance with control of the controller 13, thereby performing control to allow high temperature gas, delivered from the reformer 45, to the fuel cell stack 31 or to be directly delivered to the exhaust hydrogen combustor 47. The use of high temperature gas, delivered to the fuel cell stack 31, passing through an interior of the fuel cell stack 31 allows the fuel cell stack 31 to be warmed up and high temperature gas is delivered to the hydrogen combustor 47. Here, the fuel tank 42, the fuel pump 43, the compressor 41 and the start-up combustor 44, the reformer 45 and the bypass valve 46 form a warm-up mechanism for the fuel cell 31.

Further, during the start-up, the exhaust hydrogen combustor 47 is supplied with the air from the air compressor 41 and fuel from the fuel pump 43. The exhaust hydrogen combustor 47 carries out oxidizing reaction (combustion), in the presence of high temperature gas through the bypass valve 46 or from the fuel cell stack 31, the fuel and the air.

In addition, for the purpose of warming up the fuel cell stack 31, the fuel cell system 100 is arranged to allow a coolant pump 48, the fuel cell stack 31, a regulator valve 49, an exhaust hydrogen combustor 47 and a heater 50 to be connected through coolant delivery conduits to form a circulation system for coolant to be circulated. During the start-up of the fuel cell system 100, upon control of the controller 13, a discharge flow rate of the coolant pump 48 is regulated to allow the coolant to be delivered to the fuel cell stack 31 at a regulated discharge flow rate, and the coolant is delivered through the regulator valve 49 to the hydrogen combustor 47 or the heater 50. And, with the coolant being heated in the exhaust hydrogen combustor 47 or in a heat exchanger inside the heater 50 and delivered again through the coolant pump 48 to the fuel cell stack 31, the fuel cell stack 31 is warmed up. Here, the fuel tank 42, the fuel pump 43, the compressor 41, the exhaust hydrogen combustor 47, the heater 50, the coolant pump 48 and the regulator valve 49 form a warm-up mechanism for the fuel cell 31. Moreover, the reformer 45 is also connected to such a circulation system and heated with the heated coolant to be warmed up.

Furthermore, during normal operation of the fuel cell system 100, the exhaust hydrogen combustor 47 allows flammable gas such as hydrogen, expelled from the fuel cell stack 31 resulting from non-consumption, to be oxidized to form inactive gas to be discharged to the atmosphere.

With such a fuel cell system 100, the reformer 45 is connected to the fuel pump 43 through a fuel delivery pipe P1 and also connected to the fuel cell stack 31 through a reform gas delivery pipe P2. During normal operation, the reformer 45 reforms fuel from the fuel pump 43 to form hydrogen rich reform gas which is delivered to the fuel cell stack 31. When this takes place, the reformer 45 is supplied with hydrocarbon system fuel, such as gasoline, water and air to form hydrogen and, to this end, the reformer 45 is constructed of a reactor that performs reactions as expressed in reaction formulae for steam reforming reaction or partial oxidizing reaction as indicated below.

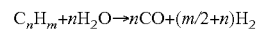

$C_nH_m + nH_2O \rightarrow nCO + (m/2+n)H_2$

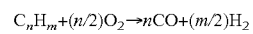

$C_nH_m + (n/2)O_2 \rightarrow nCO + (m/2)H_2$

Here, may probabilities occur where the air is used as oxygen required for partial oxidizing reaction in the moving object such as the fuel cell powered vehicle. Also, the reformer 45 may take the form of a structure utilizing a reaction system that performs the steam reforming reaction indicative of endothermic reaction combined with the partial oxidizing reaction indicative of exothermic reaction. In steam reforming reaction and partial oxidizing reaction in such a reformer 45, although hydrocarbon ($C_nH_m$), such as octane ($C_8H_{16}$), is used as raw reforming material, other material such as methanol $CH_3OH$ involving carbon atom and other components than hydrogen may be used as raw material.

Further, CO (carbon monoxide) formed in steam reforming reaction and partial oxidizing reaction serves as raw material for shift reaction expressed in a formula given below.

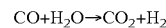

$CO + H_2O \rightarrow CO_2 + H_2$

Here, with respect to CO that was not enabled to be thoroughly reduced in shift reaction, the reformer 45 may have a selective oxidizing reactor with a catalyst to selectively oxidize CO such that, in order to protect CO from adversely affecting the high polymer electrolyte membrane inside the fuel cell stack 31, CO is converted to carbon dioxide.

Due to an ability of steam reforming reaction, partial oxidizing reaction, shift reaction and selective oxidizing reaction of the reformer 45, heat build-up occurs in the reformer 45 in dependence on partial oxidizing reaction, shift reaction and selective oxidizing reaction. That is, the fuel cell system 100 allows the air to be supplied to the start-up combustor 44 at a decreased flow rate to cause resultant high temperature gas with the residual flammable component to be delivered to the reformer 45 and also allows the air to be supplied to the respective reactors, forming the reactor 45, to cause exothermic reaction to occur therein, with reaction heat being used for warming up the respective reactors of the reformer 45. Thus, combustion in which the air is supplied to the start-up combustor 44 at a lower flow rate than that of the fuel to permit the flammable component to remain in the high temperature gas is termed "rich combustion". In such case, the reformer 45 per se doubles as a warm-up mechanism of the reformer 45 and, such a warm-up mechanism includes components part such as the start-up combustor 44 in a preceding stage.

Also, when performing the rich combustion, it is probable for flammable component, such as CO, to be contained in high temperature gas expelled from the reformer 45 for warm-up. Since this CO poisons the catalyst of the fuel cell stack 31 and has a probability of adversely affecting a performance of the fuel cell, when performing the rich combustion, the fuel cell system 100 controls the bypass valve 46 so as to supply gas, expelled from the reformer 45, directly to the exhaust hydrogen combustor 47 while bypassing the fuel cell stack 31. And, flammable component of gas, which has bypassed the fuel cell stack 31, is oxidized in the exhaust hydrogen combustor 47 to form inactive gas which in turn is discharged.

Further, in such a case, it may be so structured that exhaust gas from the exhaust hydrogen combustor 47 is delivered to the fuel cell stack 31 through a delivery pipe, which is not shown, to allow exhaust gas to warm up the fuel cell stack 31. With such a structure, the exhaust hydrogen combustor 47 is included in the warm-up mechanism, of the fuel cell stack 31, in which the other component parts such as the fuel pump 43 in a preceding stage are also included.

Furthermore, it is probable for the start-up combustor 44 to allow excess amount of the air to react with the fuel to produce substantially inactive high temperature gas with almost no inclusion of flammable component to cause high temperature gas to warm up the reformer 45. Thus, combustion in which the excess amount of the air is supplied to the start-up combustor 44 in terms of fuel so as to produce inactive high temperature gas is termed "lean combustion". In such case, the start-up combustor 44 is included in the warm-up mechanism, of the reformer 45, in which the other component part such as the fuel pump 43 in the preceding stage is also included.

Start-Up Control Operation of Fuel Cell System 100

Next, explanation is made of the start-up control operation of the fuel cell system 100 of the presently filed embodiment constructed in a manner described above.

Main flow of the start-up control operation in this embodiment is fundamentally similar to that of the first embodiment described above with reference to FIGS. 2 to 9. However, details of the start-up operation-method selecting processing and the start-up operation have different aspects that are described later. Also, the start-up control operation of the fuel cell system 100 of the presently filed embodiment substantially represents operation to warm up not only the fuel cell stack 31 but also the reformer 45, i.e., operation to warm up the electric power generating element of the fuel cell system 1, and evaluation is made at a timing in that the start-up has been completed when the warm-up of not only the fuel cell 31 but also the reformer 45, i.e., the warm-up of the electric power generating element have been completed. Also, "warm-up" of the fuel cell system 100 substantially means "warm-up" of not only the fuel cell 31 but also the reformer 45, i.e., the electric power generating element.

Completion-Judgment Threshold Setting Processing in Start-Up Operation

The completion-judgment threshold setting processing in the start-up operation during the start-up control operation of the fuel cell system 100 of the presently filed embodiment is described with reference to flowchart of FIG. 11.

Figure 11:
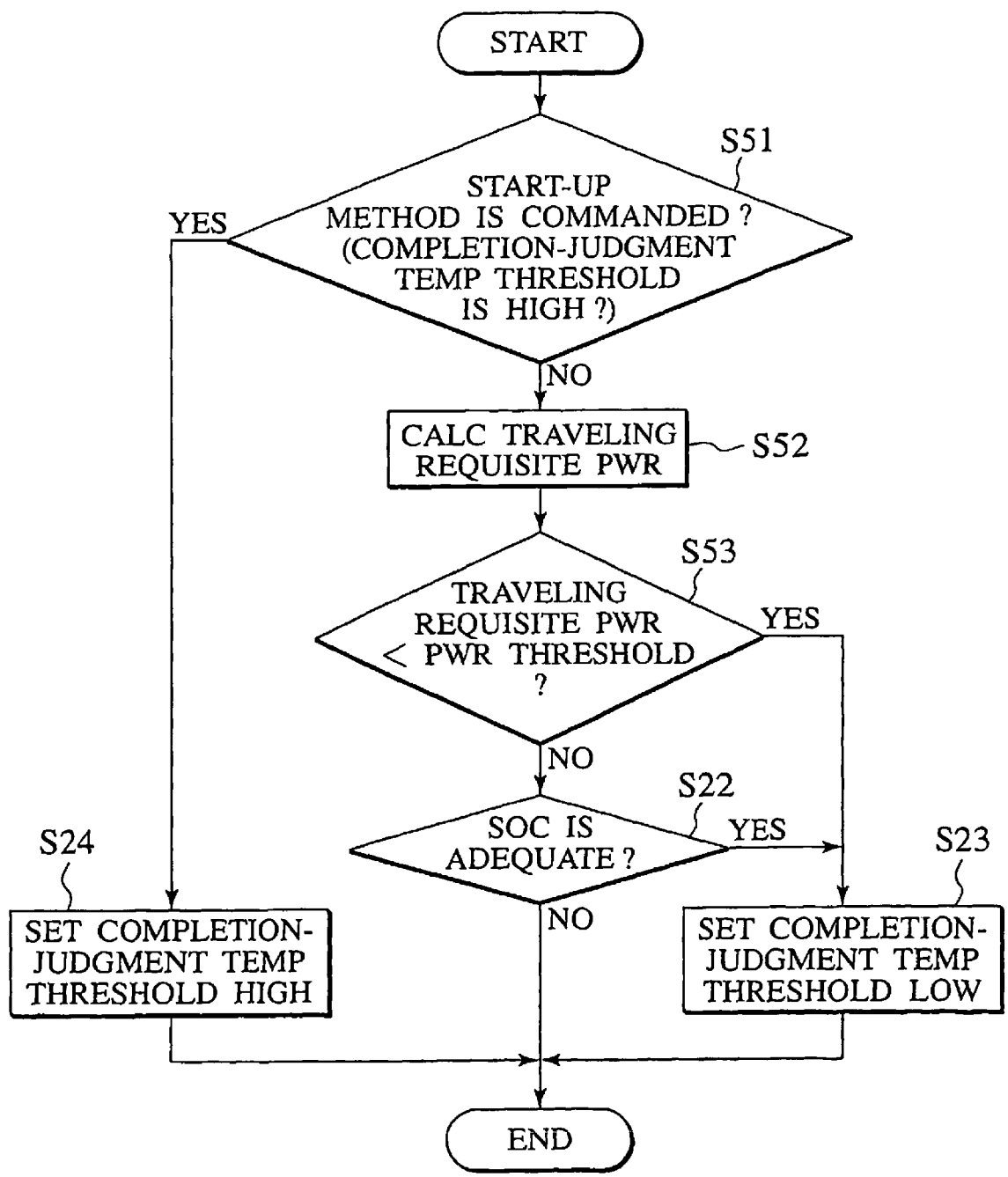
FIG. 11 is a flowchart illustrating completion-judgment threshold setting processing to be carried out during start-up operation in start-up control operation to be executed by the fuel cell system of the second embodiment.

As shown in FIG. 11, first in step S51, judgment is made by the controller 13 in response to the control signal SR from the remote operator unit 3 to find whether command is requested by the user to select the start-up operation method in which the completion-judgment temperature threshold remains high, and if judgment is made that such command is requested by the user, processing is routed to step S24 in which the completion-judgment temperature threshold is set to a high level, whereupon current processing is terminated.

On the contrary, if judgment is made in step S51 that no command for the start-up operation method in which the completion-judgment temperature threshold is high is requested by the user, processing is routed to step S52 in which the controller 13 calculates requisite electric power needed in an initial traveling stage of the moving object, and processing is routed to step S53. In this instance, the controller 13 may calculate the requisite electric power depending upon a history of electric power that has been required for traveling and been previously stored, and also in a case that a traveling route is set by a navigation system 51, the controller 13 may calculate the requisite electric power depending upon predictions in consideration of such as gradients, road classifications and jammed statuses of a high way as to the traveling route.

In next step S53, the controller 13 executes comparison in magnitude between the traveling requisite electric power, calculated in step S52, and predetermined electric power threshold, thereby discriminating to find whether the traveling requisite electric power is less than the electric power threshold. Here, the electric power threshold is set to be equal to the maximum value of the electric power, or a value close proximity thereto, available to be outputted under a condition where the fuel cell system 100 is warmed up and rated electric power is available. Here, if judgment is made that the traveling requisite electric power is less than the electric power threshold, processing is routed to step S23 in which the completion-judgment temperature threshold is lowered, and current processing is terminated. Also, in the presence of judgment that the traveling requisite electric power is less than the electric power threshold, no large quantity of electricity is required to be charged in the battery 23 and, hence, the controller 13 may operate the charging controller 21 so as to decrease the electric power to be charged to the battery 23 from the external power supply 2.

In contrast, if judgment is made that the traveling requisite electric power is not less than the electric power threshold, processing is routed to step S22 in which the SOC of the battery 23 is detected and discrimination is made to find whether the detected SOC reaches a predetermined value (e.g., a value of 80%), whereupon if judgment is made that the SOC does not reach the predetermined value, current processing is terminated. On the other hand, if judgment is made that the SOC reaches the predetermined value, processing is routed to step S23 wherein the completion-judgment temperature threshold is lowered and current processing is terminated.

During such operation, the reason why the completion-judgment temperature threshold is lowered in the absence of command from the user is based upon consideration that adequate warm-up can be achieved with heats resulting from losses in efficiencies of the reformer 45 and the fuel cell stack 31 when driving the moving object at an electric power output less than the rated electric power.

Further, the reason, why the completion-judgment temperature threshold is set to the low level when the SOC of the battery 23 exceeds the predetermined threshold, is based upon consideration that during a time interval wherein the fuel cell system 100 is not adequately warmed up and unable to generate the rated power output, a shortage of the traveling electric power is supplied from the battery 23 to the various parts and, during such time interval, the reformer 45 and the fuel cell stack 31 are caused to be adequately warmed up with self heat build-up.

Furthermore, it is conceivable that as the start-up operation method to be commanded by the user in step S51, the completion-judgment temperature threshold is set to a low value and an upper limit threshold, in which the battery 23 charged with the external power supply 2, is limited to a low value. By so doing, since minute loss occurs in charging and discharging of the battery 23, input and output electric power of the battery 23 can be restricted.

Start-Up Operation-Method Selecting Processing

Next, the start-up operation-method selecting processing during the start-up control operation of the presently filed embodiment is described mainly with reference to flowchart of FIG. 12.

As shown in FIG. 12, in step S61 subsequent to step S31 and step S32, the controller 13 executes respective comparison between the residual time with respect to the start-up completion time of the fuel cell system 100 and the temperature of the fuel cell system 100, and the first time threshold and the first temperature threshold set forth with reference to FIG. 5 related to the first embodiment, and if both the residual time with respect to the start-up completion time of the fuel cell system 100 and the temperature of the fuel cell system 100 are respectively not less than the first time threshold and the first temperature threshold, processing is routed to step S34 in which the start-up operation method with no combustion in the start-up combustor 44 is selected. Here, the "temperature" of the fuel cell system 100 means a "temperature" of the fuel cell stack 31 when the fuel cell stack 31 is to be warmed up and a "temperature" of the reformer 45 when the reformer 45 is to be warmed up, respectively.

With respect to step S34, in particular, as shown in FIG. 13, after judgment is made in step S43 that the SOC of the battery 23 is inadequate, that is, less than the start-up electric power that is predicted, in step S65, the compressor 41 and the fuel pump 43 are controlled so as to achieve the lean combustion by which the fuel cell system 100 is warmed up.

Moreover, in step S42 and step S44, the electric power may be supplied from the switch-over unit 22 to the heater 50', disposed to the reformer 45, through the above-described start-up power line, thereby permitting the reformer 45 to be directly heated up.

Turning now to flowchart of FIG. 12, in step S61, if both the residual time with respect to the start-up completion time of the fuel cell system 100 and the temperature of the fuel cell system 100 are respectively found to be less than the first time threshold and the first temperature threshold, in succeeding step S62, the residual time with respect to the start-up completion time of the fuel cell system 100 and the temperature of the fuel cell system 100 are respectively compared to a second time threshold, shorter than the first time threshold, and a second temperature threshold lower than the first temperature threshold and if both are respectively found to be less than the second time threshold and the second temperature threshold, processing is routed to step S63 and if both are respectively found not to be less than the second time threshold and the second temperature threshold, processing is routed to step S64.

In next step S64, the controller 13 controls the compressor 41 and the fuel pump 43 so as to allow the lean combustion to take place in the start-up combustor 44 to compel inactive high temperature gas to pass through the reformer 45, the fuel cell stack 31 and the exhaust hydrogen combustor 47 from the start-up combustor 44.

In the meantime, in step S63, the controller 13 controls the compressor 41 and the fuel pump 43 so as to allow the rich combustion to occur in the start-up combustor 44. Also, additionally, alternative structure may be adopted in which comparison is respectively executed between the residual time with respect to the start-up completion time of the fuel cell system 100 and the temperature of the fuel cell system 100 and a third time threshold, shorter than the second time threshold, and a third temperature threshold lower than the second temperature threshold, whereby if both are respectively found to be less than the third time threshold and the third temperature threshold, the rich combustion is achieved in the start-up combustor 44 and also the warm-up is carried out with the heater 50' to cause the catalyst of the exhaust hydrogen combustor 47 to be heated to a temperature to exhibit an activity.

Furthermore, with the fuel cell system 100 of the presently filed embodiment, during fail-off operation in step S16 in the start-up operation described with reference to FIG. 3 of the first embodiment, more particularly, steps shown in FIG. 14 are carried out.

That is, when making judgment whether to continue, interrupt and complete the start-up operation in step S13 during the start-up operation described with reference to FIG. 3 related to the first embodiment, fail-off operation in the presently filed embodiment is commenced upon operation of the controller 13 that detects information sent from particular material concentration sensors disposed inside or outside the fuel cell system 100, like in the delivery conduits, by which the various parts forming the fuel cell operating section 120 are connected and which include such as the delivery conduit P2 through which reformed gas is supplied to the fuel cell stack 31. Here, "particular material" indicates generic names indicative of materials, which adversely affect a human body or the catalyst of the fuel cell system 100, such as carbon monoxide, carbon dioxide and nitrogen oxides, and are preset in the controller 13. Moreover, in FIG. 10, the particular material concentration sensor S that detects the particular material is configured to detect the particular material expelled from the fuel cell stack 31, the reformer 45 and the warm-up mechanism and is typically shown as internally incorporated in the fuel cell system 100.

Next, in step S71 as shown in FIG. 14, judgment is made in response to information resulting from the particular material concentration sensor to find whether the concentration of particular material remains in a predetermined level to adversely affect the objects, and if judgment is made that the concentration reaches the predetermined level, in succeeding step S73, the various parts of the fuel cell operating section 120 are controlled so as to interrupt the start-up operation.

On the contrary, if judgment is made that the concentration does not reach the predetermined level, in succeeding step S72, operation is executed to set operation interruption flag, indicative of the absence of a driving status of the moving object within the predetermined time interval subsequent to the start-up completion, to "ON". Thus, execution of step S72 enables interruption of the start-up caused by the absence of the driving status of the moving object so as to be distinguished from that by the detection of the particular material.

By the way, in step S74 subsequent to step S73, the controller 13 commences warning operation in which the control signal SR, indicative of particular material being detected, is delivered to the remote operator unit 3, and processing is routed to step S75. Such warning operation includes operation to provide a display of characters or images over a display mechanism of the remote operator unit 3, operation to generate an alarm sound through a sound generating mechanism of the remote operator unit 3, and operation to cause vibration to occur through a vibration mechanism of the remote operator unit 3 and, in addition thereto, includes to provide the user with warnings like lighting up or flickering a light of the moving object body, or alerting with a horn of the moving object body. For the sake of convenience, such a mechanism W to provide warnings is representatively shown as incorporated in the remote operator unit 3 in FIG. 10.

In consecutive step S75, the controller 13 estimates or measures a distance of the remote operator unit 3 from the moving object, and processing is routed to step S76. In this instance, a GPS (Global Positioning System) may be incorporated in the controller 13, and an arrangement may be such that a plurality of waves with different intensities are transmitted from the moving object to allow estimation to be performed depending whether the remote operator unit 3 responds.

In succeeding step S76, the controller 13 operates to vary the magnitude of warning depending on the distance, obtained in step S75, between the moving object and the remote operator unit 3, and processing is routed to step S77. That is, by emphasizing a level of warning as the remote operator unit 3 closes in distance to the moving object, the user is liable to be aware of the warning. Also, the use of a device installed on the moving object to detect an obstacle or a walker in a circumference thereof may permit the controller 13 to detect the person walking closer to the moving object to provide the person with such emphasized warning.

In succeeding step S77, the controller 13 obtains information from the particular material concentration sensor again to execute judgment to find whether the concentration of particular material reaches the predetermined level, and if judgment is made that the detected concentration still remains in the predetermined level, steps subsequent to step S75 are repeatedly executed, whereas if judgment is made that the detected concentration becomes less than the predetermined level, warning is interrupted in step S78 and such processing is terminated.

In summary of the structures of the respective embodiments set forth above in detail, first, as represented by the fuel cell system of the first embodiment, since at least warm-up of the fuel cell stack 31 is completed at the start-up completion time in accordance with the control signal SR delivered from the remote operator unit 3 to make it possible to provide a situation for the electric current to be taken out from the fuel cell stack 31, the user is able to preliminarily command the start-up completion time at a location distanced from the moving object, whereby when the user rides into the moving object, he can complete the start-up operation at a suitable timing.

In addition, as represented by the fuel cell system of the second embodiment, since the warm-up of the fuel cell stack 31 and the reformer 45 can be completed at the start-up completion time in accordance with the control signal SR delivered from the remote operator unit 3 to provide a condition in which the electric current can be taken out from the fuel cell stack 31, the user is able to preliminarily command the start-up completion time at a location distanced from the moving object, whereby when the user rides into the moving object, the start-up operation can be completed at a suitable timing.

Further, in the respective embodiments, since the timer of the controller 13 can be utilized to permit the start-up of the fuel cell stack 31 and the reformer 45 to be completed at a predetermined time which the user utilizes the moving object every time, the start-up operation can be completed at a timing appropriate for the user.

Furthermore, especially in the second embodiment, due to an ability of the rich combustion being performed when the residual time with respect to the start-up completion time is shorter than the second time threshold shorter than the first time threshold and the temperatures of the fuel cell stack 31 and the reformer 45 are lower than the second temperature threshold lower than the first temperature threshold, whereas the lean combustion is performed when the residual time with respect to the start-up completion time is longer than the second time threshold and the temperatures of the fuel cell stack 31 and the reformer 45 are higher than the second temperature threshold, combustion modes of fuel can be altered.

In addition, in the respective embodiments, the start-up completion time and/or the residual time with respect to the start-up completion time can be transmitted to the remote operator unit 3, the residual time with respect to the start-up completion time can be displayed over the remote operator unit 3, thereby enabling an actual start-up completion time to be confirmed. Also, upon receipt of the control signal, with a request to alter the start-up completion time, from the remote operator unit 3 depending on the residual time with respect to the start-up completion time being displayed over the remote operator unit 3, the start-up is completed at the altered start-up completion time and, thus, the start-up operation can be completed at a timing further appropriate for the user.

Additionally, in the respective embodiments, with the fuel cell system, since the fuel cell stack 31 and the reformer 45 can be warmed up selecting different start-up operation methods in dependence on the conditions associated with the fuel cell stack 31 and the reformer 45, that is, the residual time with respect to the start-up completion time, the temperatures of the fuel cell stack 31 and the reformer 45 and the SOC of the battery 23, an appropriate start-up operation method can be selected in dependence on the circumferential environments of the moving object as well as statuses of the fuel cell stack 31 and the reformer 45, thereby enabling the start-up to be reliably completed at the start-up completion time.

Moreover, in the respective embodiments, if the residual time with respect to the start-up completion time is shorter than the first time threshold and the temperatures of the fuel cell stack 31 and the reformer 45 are lower than the first temperature threshold, since the warm-up can be executed utilizing combustion heats of the combustor 35, the start-up combustor 44 and the exhaust hydrogen combustor 47, the warm-up can be completed at an appropriate timing even when there is a need for rapid start-up with a short length of time before the start-up completion time set by the remote operator unit 3.

Furthermore, in the respective embodiments, since the flow rate of the hydrogen gas to be supplied to the combustor 35, the start-up combustor 44 and the exhaust hydrogen combustor 47 can be regulated in dependence on the residual time with respect to the start-up completion time and the temperatures of the fuel cell stack 31 and the reformer 45 and the flow rate of the coolant can be regulated, electric power consumptions of the coolant pumps 37, 48, the blower 34 and the compressor 41 can be restricted when the residual time with respect to the start-up completion time is longer, enabling the electric power consumptions to be minimized during the start-up.

In addition, in the respective embodiments, since the blower 34, the compressor 41 and the coolant pumps 37, 48 are driven in the operating regions at which the flow rate is smaller than the maximum gas flow rates required for the warm-up of the fuel cell stack 31 and the reformer 45 with the operating efficiencies remaining at the high efficiencies, the operating efficiencies during the start-up operation can be improved when the residual time with respect to the start-up completion time is long.

Moreover, in the respective embodiments, as the condition associated with the start-up of the fuel cell stack 31 and the reformer 45, judgment is made to find whether the electric power is available from the external power supply 2, and different warm-up operations are selected, it is possible to select an appropriate start-up operation method through the use of the electric power of the external power supply 2 at needs.

Additionally, in the respective embodiments, in a case that the external power supply 2 is found to be available, since the external power supply 2 has a priority over the battery 23 to supply the electric power, in an event that a predetermined time before the start-up completion time is long, fuel of the moving object and the electric power of the battery 23 can be avoided form being consumed.

Further, in the respective embodiments, in a case that the external power supply 2 is found to be available, since the electric power delivered from the external power supply 2 is charged to the battery 23 prior to the warm-up, it is possible to select an appropriate start-up operation method utilizing the battery 23 of the charging control section 11.

Furthermore, in the respective embodiments, due to an ability of the electric power delivered from the external power supply 2 being charged to the battery 23 to allow the SOC of the battery 23 to be higher than the SOC thereof associated with a normal traveling condition of the moving object prior to warm-up such that a charged state immediately after the beginning of drive of the moving object is increased to be higher than a charged state appearing under the normal traveling condition of the moving object, the electric power can be supplied from the battery 23 even when the electric power output generated by the fuel cell stack 31 immediately after the start-up is in short.

Moreover, in the respective embodiments, due to an ability of the electric power being supplied from the battery 23 to the various parts to drive the moving object, heat build-up resulting from the electric power generation effectuated in the fuel cell stack 31 with no fully warmed up condition can be utilized for warming up the fuel cell stack 31 and the reformer 45, enabling efficient warm-up to be achieved.

In addition, in the respective embodiments, if the SOC of the battery 23 is higher than the SOC appearing during the normal traveling condition of the moving object, since the start-up completion-judgment threshold, in which the warm-up of the fuel cell stack 31 and the reformer 45 is judged to be completed and the start-up completion is found to be achieved, is altered to allow the start-up completion to be judged in an early stage, it is possible to comply with requirement for rapid start-up through the use of the battery 23.

Additionally, in the respective embodiments, if the residual time with respect to the start-up completion time is short, since the electric power is supplied from the battery 23 until the battery 23 has a higher predetermined SOC than the lower limit threshold of the SOC during the normal traveling condition of the moving object, it is possible to comply with requirement for further rapid start-up completion.

Also, in the respective embodiments, in a case that the external power supply 2 is available for use, the electric power is supplied from the external power supply 2 to the heaters 39, 50 for achieving the warm-up, the consumption of the hydrogen gas can be restricted.

Further, in the respective embodiments, in a case that the residual time with respect to the start-up completion time is short and the temperatures of the fuel cell stack 31 and the reformer 45 are low, since the warm-lip can be achieved through the use of heats build-up in the heaters 39, 50 and the combustion heat, it is possible to comply with requirement for further rapid start-up completion.

Furthermore, in the respective embodiments, as the condition related to the start-up of the fuel cell stack 31 and the reformer 45, a history of the traveling requisite electric power that has been stored is judged to allow the different start-up operation methods to be selected, whereby if the traveling requisite electric power is small for a predetermined time interval after commencement of traveling, the fuel cell stack 31 is commenced in operation under a status where the fuel cell stack 13 is unable to output the rated power output due to the insufficient warm-up condition to permit self heat build-up of the fuel cell stack 31 to be utilized for warming up the fuel cell stack 31, thereby enabling an appropriate start-up operation method to be selected for efficient warm-up.

Moreover, in the respective embodiments, since operation is executed to calculate the traveling requisite electric power for the predetermined time interval immediately, after the fuel cell stack 31 and the reformer 45 are warmed up and the start-up is initiated, and to select different start-up operation methods, in dependence on the traveling route of the moving object, in a case that the traveling requisite electric power is small in terms of the traveling route, operation of the fuel cell stack 31 can be commenced under a condition in which the fuel cell stack 31 remains in the inadequate warm-up condition and the fuel cell stack 31 is unable to generate the rated electric power such that the fuel cell stack 31 can be warmed up through the use of self heat build-up of the fuel cell stack 31, and thus, an appropriate start-up operation method can be selected for efficient warm-up.

Additionally, in the respective embodiments, in a case that the traveling requisite electric power is less than the predetermined electric power threshold, since the electric power to be charged from the external power supply 2 to the battery 23 is decreased, operation of the fuel cell stack 31 can be commenced under a status in which the fuel cell stack 31 remains in the inadequate warm-up condition and still remains in an unavailable condition to generate the rated electric power, whereby the fuel cell stack 31 can be warmed up through the use of self heat build-up of the fuel cell stack 31, thereby enabling an appropriate start-up operation method to be selected for efficient warm-up, while decreasing the SOC upper-limit threshold occurring when charged to the battery 23 to a lower value so as to restrict consumption of the external power supply 2 for thereby suppressing a power loss from being caused by charging and discharging the battery 23 and the battery 23 from being degraded.

Moreover, in the respective embodiments, in a case that the traveling requisite electric power is less than the predetermined electric power threshold, since the start-up completion-judgment threshold, in which judgment is made that the warm-up of the fuel cell stack 31 and the reformer 45 is completed to regard as the start-up completion, is altered to enable the start-up completion to be judged in an early stage, it is possible to select the start-up operation method with a further wide range in which a part of the warm-up of the fuel cell stack 31 is performed with self heat build-up.

Further, in the respective embodiments, if no moving object is commenced to travel after the start-up completion, or if the control signal is inputted from the remote operator unit 3 to retard the start-up operation time prior to completing the start-up, since operation is executed to continue the warm-up of the fuel cell stack 31 and the reformer 45, it becomes possible to comply with a situation where a drive start program of the moving object is prolonged and the moving object is not commenced to be driven even after the start-up operation has been completed.

Furthermore, in the respective embodiments, if no moving object is commenced to travel after the start-up completion, or if the control signal is inputted from the remote operator unit 3 to retard the start-up operation time prior to completing the start-up, since a part of the electric power generated by the fuel cell stack 31 is supplied to the external power supply 2, the fuel cell stack 31 is operated to allow the temperatures of the fuel cell stack 31 and the reformer 45 to be kept at appropriate temperatures while enabling resulting the electric power to be effectively utilized such as selling of resulting electric power.

Moreover, in the respective embodiments, if no moving object is commenced to travel after the start-up completion, the electric power generation of the fuel cell stack 31 is halted and no wasteful electric power consumption can be restricted.

Also, in the respective embodiments, since control is executed depending on the control signal delivered from the remote operator unit 3 to command a direct start-up operation method, even if it is scheduled to travel on a traveling route different from a normal route with no traveling route being set, it is possible to command, for example, the warm-up of the fuel cell stack 31 due to self heat build-up thereof after commencing travel.

In addition, as representatively indicated particularly in the second embodiment, if particular material is detected, the start-up operation is interrupted and, hence, it is possible to comply with a situation in which particular material, occurred due to some reasons, adversely affecting the fuel cell system and the user are detected.

Further, in such a case, since operation is made to drive the light of the moving object for providing the user with warnings that can be recognized from the outside, it is possible to provide the user with warnings not to approach the circumference of the moving object.

Furthermore, in such a case, since the control signal indicative of particular material being detected is transmitted to the remote operator unit 3 to provide the same with warnings, warnings can be provided to the user who is distanced from the moving object for thereby urging the user, who is distanced from the moving object, to take an appropriate measure. Also, in such a manner, since the remote operator unit 3 provides warnings while providing a display of particular material being detected, it is possible for detected particular material to be appealed to the sense of sight of the user while at the same time, enabling information, such as a drop in a particular material detection level, to be provided. Moreover, in a case that the remote operator unit 3 drives a vibrating mechanism and a sound generating mechanism to provide warnings upon receipt of the control signal indicative of particular material being detected, warnings can be reliably provided to the user even if the remote operator unit 3 is carried by the user with an inability to visually check. Moreover, since a distance between the moving object and the remote operator unit 3 is closer and warnings of detected particular material can be emphasized at an increased intensity, if the user is present on a place remote from the moving object to the extent that the user is not adversely affected by particular material, warnings are provided at a low level, whereby when the user comes closer to the moving object, warnings can be reliably provided to the user.

Incidentally, while the above respective embodiments have been described in conjunction with an exemplary case where the power source of the moving object includes the fuel cell stack 31, it is of course to be noted that the present invention is not limited to such exemplary case and the present invention can be applied to a case where an internal combustion engine, which is fueled with hydrogen rich gas, is used as a power source and a reforming system is started up to reform hydrocarbon fuel to generate hydrogen rich gas.

Furthermore, although the second embodiment has been described in connection with the structure in which the reformer is disposed separately from the fuel cell per se, it is of course not objectionable to take the form of a structure to allow the reformer to be incorporated in the fuel cell in a unitary structure to compel both of these components to be simultaneously warmed up.

In addition, although the second embodiment has been described in connection with an example where, in case of the reformer system being included, hydrocarbon material such as gasoline is used as reforming material, it is of course to be appreciated that the present invention is not limited to such an example and may be applied to a system in which hydrogen is taken out from chemical reaction of compound including hydrogen such as decalin ($C_{10}H_{18}$) and sodium boronhydride ($NaBH_4$) and which is warmed up to an appropriate predetermined temperature.

Moreover, although the respective embodiments have been described with reference to a case where the present system is applied to the automobile serving as the moving object, the present invention can be applied to a two-wheeled vehicle, a ship or an aircraft and it is of course to be noted that the present invention can be applied to a case where a fuel cell and an internal combustion engine, fuelled with hydrogen rich gas, are used as auxiliary power sources.

Also, although the various embodiments have been described with reference to a case where the coolant is warmed to thereby achieve the warm-up of the fuel cell stack 31, the present invention is not limited to such a case and another warm-up operation may be undertaken to warm up the fuel cell stack 31 by an electric heating wire incorporated therein through the use of the electric power.

The entire content of a Patent Application No. TOKUGAN 2002-323765 with a filing date of Nov. 7, 2002 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

As set forth above, according to the fuel cell system of the present invention, since the warm-up of the fuel cell is completed at least at the start-up completion time in accordance with the control signal delivered from the remote operator unit to provide a status available for taking out electric current from the fuel cell, whereby the user is able to preliminarily command the start-up completion time at a location remote from the moving object and the warm-up operation is able to be completed at the preferable timing when the user gets in the moving object, this invention has a wide application range involving a fuel cell powered automobile equipped with such a fuel cell system.

The invention claimed is:

1. A fuel cell system adapted to be installed on a moving object, the fuel cell system comprising:
   an electric power generating element including a fuel cell supplied with fuel gas and oxidizing gas to generate electric power;
   different warm-up mechanisms including a warm-up mechanism operated by a combustion and a warm-up mechanism operated by electric power, and dependent on a condition related to start-up of the fuel cell system to carry out warm up of the electric power generating element; and
   a controller controlling an operation of the fuel cell system, and in response to reception of a control signal transmitted from an external remote operator unit and commanding a start-up completion time at which the start-up of the fuel cell system is to be completed through the warm-up of the electric power generating element, controlling the warm-up mechanisms to allow the warm-up of the electric power generating element to be completed in alignment with the start-up completion time,
   wherein the controller is configured to select and control one of the different warm-up mechanisms in response to the received control signal and dependent on the condition related to the start-up of the fuel cell system, the condition including a residual time with respect to the start-up completion time and a temperature of the electric power generating element thereby carrying out the warm-up of the electric power generating element with the one of the different warm-up mechanisms, which is selected by the controller, in a start-up control operation of the fuel cell system wherein the residual time is less than the start-up completion time.

2. The fuel cell system according to claim 1, wherein the controller is provided with a timer, and the start-up completion time is set by use of the timer.

3. The fuel cell system according to claim 1, wherein the controller transmits, to the remote operator unit, a signal that compels at least one of the start-up completion time and the residual time with respect to the start-up completion time to be displayed over the remote operator unit and controls the different warm-up mechanisms with a view to achieving the warm-up of the electric power generating element in response to a control signal, transmitted from the remote operator unit, to alter the start-up completion time.

4. The fuel cell system according to claim 1, wherein the warm-up mechanism, operated by the combustion, include a combustor that combusts moving object fuel used for driving a moving object and heats heat exchanging medium, a fuel supply system that supplies the moving object fuel to the combustor, and a heat exchanging medium circulation system that permits the heat exchanging medium, heated by the combustor, to be circulated to the electric power generating element,
   and wherein in a case that the residual time with respect to the start-up completion time is shorter than a first time threshold and a temperature of the electric power generating element is lower than a first temperature threshold, the controller controls the fuel supply system and the combustor to allow the moving object fuel to be combusted so as to allow the heat exchanging medium, heated through the heat exchanging medium circulation system, to be supplied to the electric power generating element.

5. The fuel cell system according to claim 4, wherein in response to the residual time with respect to the start-up completion time and the temperature of the electric power generating element, the controller controls the fuel supply system to regulate a flow rate of the moving object fuel to be supplied to the combustor and the heat exchanging medium circulation system to regulate a flow rate of the heat exchanging medium to be supplied to the electric power generating element.

6. The fuel cell system according to claim 4, further comprising an oxygen containing gas supply system that supplies oxygen containing gas including oxygen to the combustor,
   wherein in a case that the residual time with respect to the start-up completion time is shorter than a second time threshold that is shorter than the first time threshold and the temperature of the electric power generating element is lower than a second temperature threshold that is lower than the first temperature threshold, the controller controls the oxygen containing gas supply system to reduce a supply rate of the oxygen containing gas in terms of a supply rate of the moving object fuel to be supplied to the combustor from the fuel supply system, whereas in a case that the residual time with respect to the start-up completion time is equal to or longer than the second time threshold and the temperature of the electric power generating element is equal to or higher than the second temperature threshold, the controller controls the oxygen containing gas supply system to increase the supply rate of the oxygen containing gas in terms of the supply rate of the moving object fuel to be supplied to the combustor from the fuel supply system.

7. The fuel cell system according to claim 6, wherein the controller executes control so as to operate the oxygen containing gas supply system in consideration of an operating efficiency obtained from a flow rate and a pressure ratio of the oxygen containing gas of the oxygen containing gas supply system.

8. The fuel cell system according to claim 1, wherein the warm-up mechanism, operated by the electric power, includes a battery and an electric power switch-over unit that switches over between electric power supplied from the battery and electric power supplied from an external power supply to be supplied to the warm-up mechanisms,
   and wherein the controller makes judgment to find whether the external power supply is available for supplying the electric power from the external power supply to the different warm-up mechanisms, as the condition related to the start-up of the fuel cell system, and controls the different warm-up mechanisms with a view to selecting at least one of the plurality of warm-up operations.

9. The fuel cell system according to claim 8, wherein in a case that the external power supply is available for supplying the electric power from the external power supply to the different warm-up mechanisms, the controller controls the electric power switch-over unit such that the external power supply has a priority over the battery to supply the electric power to the different warm-up mechanisms.

10. The fuel cell system according to claim 1, wherein the different warm-up mechanisms include a battery and an electric power switch-over unit that switches over between electric power supplied from the battery and electric power supplied from an external power supply to be supplied to the different warm-up mechanisms, the fuel cell system further comprising a charging controller allowing the electric power supplied from an external power supply to be charged to the battery in a case that the external power supply is available for supplying the electric power from the external power supply to the battery.

11. The fuel cell system according to claim 10, wherein the controller operates through the charging controller so as to allow the electric power from the external power supply to be charged to the battery such that a state of charge of the battery prior to the warm-up being completed by the different warm-up mechanisms becomes higher than a state of charge of the battery during a normal traveling condition of the moving object, and such that a state of charge of the battery at the beginning of driving of the moving object becomes higher than the state of charge of the battery during the normal traveling condition of the moving object.

12. The fuel cell system according to claim 11, wherein in a case that the state of charge of the battery is higher than the state of charge of the battery during the normal traveling condition of the moving object, the controller alters a start-up completion-judgment threshold, by which judgment is made such that the start-up of the fuel cell system is completed while completing the warm-up of the electric power generating element, to a value to shorten a time period for judgment that the start-up of the fuel cell system is completed.

13. The fuel cell system according to claim 8, wherein in a case that the external power supply is not available for supplying the electric power from the external power supply to the different warm-up mechanisms and the residual time with respect to the start-up completion time is equal to or longer than a first time threshold, the controller controls the electric power switch-over unit to allow electric power from the battery to be supplied to the different warm-up mechanisms under a range of a state of charge that is higher than a lower limit threshold of the state of charge of the battery during the normal traveling condition of the moving object.

14. The fuel cell system according to claim 9, wherein the different warm-up mechanisms include a heater that heats up by use of the electric power supplied through the electric power switch-over unit, and wherein in a case that the external power supply is available for supplying the electric power from the external power supply to the different warm-up mechanisms, the electric power switch-over unit allows the electric power supplied from the external power supply to be supplied to the heater.

15. The fuel cell system according to claim 6, wherein the different warm-up mechanisms include a battery and an electric power switch-over unit that switches over between electric power supplied from the battery and electric power supplied from an external power supply to be supplied to the different warm-up mechanisms and a heater that heats up by use of the electric power supplied from the electric power switch-over unit, and wherein in a case that the residual time with respect to the start-up completion time is shorter than a third time threshold that is shorter than the second time threshold and the temperature of the electric power generating element is lower than a third temperature threshold that is lower than the second temperature threshold, the controller controls the electric power switch-over unit to allow the warm-up to be performed through the heater and controls the combustor to allow the moving object fuel to combust for achieving the warm-up.

16. The fuel cell system according to claim 1, wherein the controller stores a history of traveling requisite electric power of the moving object subsequent to the start-up through the warm-up of the electric power generating element and in consideration of the history as the condition related to the start-up of the fuel cell system, controls the different warm-up mechanisms with a view to selecting at least one of the plurality of warm-up operations.

17. The fuel cell system according to claim 1, further comprising a moving route setting section that allows a moving route of the moving object to be set;

wherein the controller, based on the moving route set by the moving route setting section as the condition related to the start-up of the fuel cell system, calculates traveling requisite electric power of the moving object subsequent to the start-up through the warm-up of the electric power generating element and controls the different warm-up mechanisms to select at least one of the plurality of warm-up operations.

18. The fuel cell system according to claim 1, further comprising:

a battery; and a charging controller allowing electric power supplied from an external power supply to be charged to the battery in a case that the external power supply is available for supplying the electric power from the external power supply to the warm-up mechanisms, wherein in a case that traveling requisite electric power of the moving object is lower than a predetermined electric power threshold, the controller operates through the charging controller to decrease electric power to be charged from the external power supply to the battery.

19. The fuel cell system according to claim 1, wherein in a case that traveling requisite electric power of the moving object is lower than a predetermined electric power threshold, the controller alters a start-up completion judgment threshold, by which judgment is made such that the start-up of the fuel cell system is completed while completing the warm-up of the electric power generating element, to a value to shorten a time period for judgment that the start-up of the fuel cell system is completed.

20. The fuel cell system according to claim 1, wherein in a case that no travel of the moving object is commenced even after the start-up of the fuel cell system has been completed through the warm-up of the electric power generating element, the controller controls the different warm-up mechanisms to continue the warm-up of the electric power generating element.

21. The fuel cell system according to claim 1, wherein, prior to the start-up of the fuel cell system being completed, in a case that the controller is inputted with a control signal, from the remote operator unit, to prolong the start-up completion time, the controller controls the different warm-up mechanisms to continue the warm-up of the electric power generating element.

22. The fuel cell system according to claim 1, wherein in a case that no travel of the moving object is commenced even after the start-up of the fuel cell system has been completed through the warm-up of the electric power generating element, the controller allows a part of electric power, generated from the electric power generating element, to be supplied to an external power supply.

23. The fuel cell system according to claim 1, wherein prior to the start-up of the fuel cell system being completed, in a case that the controller is inputted with a control signal, from the remote operator unit, to prolong the start-up completion time, the controller allows a part of electric power, generated from the electric power generating element, to be supplied to an external power supply.

24. The fuel cell system according to claim 1, wherein in a case that no travel of the moving object is commenced even after the start-up of the fuel cell system has been completed through the warm-up of the electric power generating element, the controller interrupts the electric power generating element from generating electric power.

25. The fuel cell system according to claim 1, wherein the controller controls the different warm-up mechanisms in response to a control signal, delivered from the remote operator unit, to command either one of warm-up operations such that the warm-up of the electric power generating element is performed in the warm-up operation commanded by the remote operator unit.

26. The fuel cell system according to claim 1, wherein in a case that particular material preliminarily set to be expelled from the fuel cell system is detected, the controller controls the different warn-up mechanisms to interrupt the warm-up of the electric power generating element.

27. The fuel cell system according to claim 26, wherein in a case that the particular material is detected, the controller provides a warning available to be recognized from an outside of a moving object.

28. The fuel cell system according to claim 27, wherein in a case that the particular material is detected, the controller transmits a control signal, indicative of the particular material being detected, to the remote operator unit to allow the remote operator unit to provide the warning.

29. The fuel cell system according to claim 28, wherein in a case that the particular material is detected, information indicative of the particular material being detected is recognized through the remote operator unit using at least one of a visual sense, a tactual sense and a hearing sense.

30. The fuel cell system according to claim 29, wherein in a case that the particular material is detected, the controller drives a sound generating mechanism to provide the warning.

31. The fuel cell system according to claim 27, wherein the controller varies a magnitude of warning depending on a distance between the moving object and the remote operator unit.

32. The fuel cell system according to claim 1, wherein the electric power generating element includes a reformer that reforms raw material to form the fuel gas.

33. The fuel cell system according to claim 26, wherein the electric power generating element includes a reformer that reforms raw material to foi in the fuel gas, and wherein the particular material is expelled from at least one of the fuel cell, the reformer and the different warm-up mechanisms.

\* \* \* \* \*